US009684309B2

(12) United States Patent
Carter et al.

(10) Patent No.: US 9,684,309 B2
(45) Date of Patent: Jun. 20, 2017

(54) AIRCRAFT GUIDANCE BASED ON PARTIAL DIFFERENTIAL EQUATION FOR MISS DISTANCE

(71) Applicant: The Charles Stark Draper Laboratory, Inc., Cambridge, MA (US)

(72) Inventors: David W. Carter, Nahant, MA (US); Scott A. Rasmussen, Andover, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 15 days.

(21) Appl. No.: 14/989,033

(22) Filed: Jan. 6, 2016

(65) Prior Publication Data

US 2016/0266582 A1    Sep. 15, 2016

Related U.S. Application Data

(60) Provisional application No. 62/132,239, filed on Mar. 12, 2015.

(51) Int. Cl.
*G05D 1/12* (2006.01)
*G01C 23/00* (2006.01)
*B64D 17/00* (2006.01)

(52) U.S. Cl.
CPC .............. *G05D 1/12* (2013.01); *G01C 23/00* (2013.01)

(58) Field of Classification Search
CPC ........... G05D 1/12; G01C 23/00; B64D 17/00
USPC .................................................. 701/3, 408
See application file for complete search history.

(56) References Cited

U.S. PATENT DOCUMENTS

| 5,678,784 | A | * | 10/1997 | Marshall, Jr. | .......... | B64G 1/005 |
| | | | | | | 244/138 R |
| 6,758,442 | B2 | * | 7/2004 | Bailey | .................... | B64D 17/34 |
| | | | | | | 244/142 |
| 6,808,144 | B1 | | 10/2004 | Nicolai et al. | ................. | 244/139 |

(Continued)

OTHER PUBLICATIONS

Carter, et al. "Autonomous Guidance, Navigation, and Control of Large Parafoils," 18th AIAA Aerodynamic Decelerator Systems Technology Conference and Seminar, 16 pages, 2005.

(Continued)

*Primary Examiner* — Tan Q Nguyen
(74) *Attorney, Agent, or Firm* — Sunstein Kann Murphy & Timbers LLP

(57) ABSTRACT

A guidance, navigation and control (GNC) system guides an aircraft based on a special partial differential equation (PDE). The system does not depend on a predetermined desired flight path. To overcome effects of unpredictable wind speed and direction, systems and methods effectively repeatedly determine the worst landing the wind can cause and issue flight control commands that minimize among these worst outcomes. A function C that satisfies the PDE calculates smallest miss distance a guidance system can bring about by appropriately steering an aircraft, given the aircraft's current heading, current location relative to a target and current remaining amount of time to fly. The system repeatedly determines at least a component of a current gradient of the function C. A value of the gradient component is used to select an appropriate flight control command, such as turn left or turn right.

21 Claims, 11 Drawing Sheets

(56) References Cited

U.S. PATENT DOCUMENTS 8,800,930 B1 8/2014 Bourakov et al. ............ 244/152
2007/0088466 A1* 4/2007 Preston ................ G05B 13/042
701/3

OTHER PUBLICATIONS

Carter, et al. "Games Against the Wind: Guided Parafoil Accuracy," 23rd AIAA Aerodynamic Decelerator Systems Technology Conference, 11 pages, Apr. 3, 2015.

"An Overview of the Hamilton-Jacobi Equation," University of Chicago, 21 pages, Jan. 8, 2013.

Costello "A New Way to Control Parafoils," Center for Micro Mobile Machines, 8 pages, Mar. 2012.

Mitchell, et al. "A Toolbox of Hamilton-Jacobi Solvers for Analysis of Nondeterministic Continuous and Hybrid Systems," HSCC, 14 pages, 2005.

Warnock "Hamilton-Jacobi equation," Scholarpedia, http://www.scholarpedia.org/article/Hamilton-Jacobi_equation, 11 pages, Oct. 21, 2011.

Wikipedia "Axes conventions," http://en.wikipedia.org/wiki/axes_conventions, 6 pages, Dec. 31, 2014.

Wikipedia "Differential operator," http://en.wikipedia.org/wiki/differential_operator, 7 pages, Feb. 1, 2015.

Wikipedia "Divergence," http://en.wikipedia.org/wiki/divergence, 7 pages, Feb. 18, 2015.

Wikipedia "Gradient," https://en.wikipedia.org/wiki/Gradient, 9 pages, Feb. 21, 2015.

Wikipedia "Laplace operator," https://en.wikipedia.org/wiki/Laplace_operator, 8 pages, Feb. 15, 2015.

Wikipedia "Vector field," https://en.wikipedia.org/wiki/Vector_field, 10 pages, Mar. 1, 2015.

Wikipedia "Vector operator," https://en.wikipedia.org/wiki/Vector_operator, 2 pages, Dec. 30, 2014.

Yakimenko, et al. "Development and Testing of the Miniature Aerial Delivery System Snowflake," 20th Aerodynamic Decelerator Systems Technology Conference and Seminar, 15 pages, May 4-7, 2009.

Yatoh, et al. "Navigation, Guidance and Control of Parafoil Recovery System for KIT' Experimental Rocket," Proceedings of the 2006 KSAS-JSASS Joint International Symposium on Aerospace Engineering, 6 pages, 2006.

* cited by examiner

AIRCRAFT GUIDANCE BASED ON PARTIAL DIFFERENTIAL EQUATION FOR MISS DISTANCE

CROSS REFERENCE TO RELATED APPLICATIONS

This application claims the benefit of U.S. Provisional Patent Application No. 62/132,239, filed Mar. 12, 2015, titled "Process for Guiding an Unpowered Aircraft to a Specified Location using a Stored Table of Hamilton-Jacobi Solutions," the entire contents of which are hereby incorporated by reference herein, for all purposes.

STATEMENT REGARDING FEDERALLY SPONSORED RESEARCH OR DEVELOPMENT

This invention was made with government support under Contract Number W15QKN-12-C-0131 awarded by the U.S. Army Natick Soldier Research, Development and Engineering Center. The U.S. Government has certain rights in the invention.

TECHNICAL FIELD

The present invention relates to automatic guidance systems and, more particularly, to automatic guidance systems that use calculated landing accuracy of aircraft to generate commands for control actuators.

BACKGROUND ART

Automatic guidance systems are used to guide powered and unpowered aircraft toward desired targets. For example, the experimental airdrop system named "Snowflake," jointly developed by the Naval Postgraduate School and the University of Alabama in Huntsville, is an autonomously guided unpowered parafoil (aerodynamic decelerator system or ADS). The system includes guidance, navigation and control (GNC) electronics that receive global positioning system (GPS) data and generate real-time flight control signals that control the parafoil via actuators. The GNC electronics attempt to cause the parafoil to fly a trajectory that matches a desired trajectory to a target on the ground. The system assumes the parafoil descends at a constant rate.

The desired trajectory includes flying directly toward the target until the system reaches a loitering altitude. The system then flies along an approximately circular (in top view) spiral path until the system reaches a lower altitude. While in the spiral path, the device estimates wind direction and wind speed by comparing GPS-provided ground speeds at various points along the circular path. When flying in the same direction as the wind, the ground speed is greatest, and when flying directly against the wind, the ground speed is least, thereby enabling the system to automatically determine when the parafoil is flying with the wind and when it is flying against the wind. From these measurements, the system estimates the wind direction. A difference between the greatest and the least ground speeds provides an estimate of the wind speed.

After leaving the spiral, the system flies in the direction of the wind, past the target, and then it executes a 180° turn to fly directly into the wind, toward the target. The location of the beginning of the 180° turn is calculated to cause the system to end the turn directly downwind of the target and at an altitude that will cause the system to land at the target, given the system's design air speed and design descent rate and the estimated wind speed. Landing directly into the wind minimizes ground speed at the landing, thereby providing a relatively soft landing.

Wind is, however, variable and unpredictable, leading to landing location errors. Improved GNC would provide more accurate landings.

SUMMARY OF EMBODIMENTS

An embodiment of the present invention provides a method for automatically guiding an aircraft. The aircraft is guided toward a target. The aircraft may be guided through wind. The wind may be variable. The aircraft has a maximum turn rate. The method includes: (a) receiving signals indicating current location, current altitude and current heading of the aircraft. (b) From the signals indicating the current location of the aircraft, current coordinates of the aircraft are automatically calculated, relative to location of the target. (c) From the signals indicating the current altitude of the aircraft, current remaining amount of time of flight of the aircraft is automatically estimated.

(d) At least one component of a current gradient of function C is automatically determined. C satisfies a partial differential equation and a boundary condition. C represents miss distance as a function of at least the current heading of the aircraft, the current coordinates of the aircraft, relative to the location of the target, and the current remaining amount of time of flight of the aircraft.

(e) The at least one component of the current gradient is automatically compared to at least a first predetermined value and/or a second predetermined value. (f) If the at least one component of the current gradient is found by the comparing to be less than the first predetermined value, a first signal commanding a turn of the aircraft in a first direction is automatically sent. The first direction may be right.

(g) If the at least one component of the current gradient is found by the comparing to be greater than the second predetermined value, a second signal commanding a turn of the aircraft in a second direction, opposite the first direction, is automatically sent. The second direction may be left.

(h) Operations (a)-(g) are repeated until the current remaining amount of time of flight of the aircraft is less than a third predetermined value.

The aircraft may be characterized by an amount by which its airspeed can be changed while maintaining flight. C may take into account the amount by which the aircraft airspeed can be changed.

C may satisfy a Hamilton-Jacobi partial differential equation. C may satisfy a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}},$$

and
The boundary condition may be of the form:

$C(x,y,t) = (x^2+y^2)^{1/2}$ at $t=0$, where:

x and y may represent coordinates of the aircraft relative to the target, in a frame whose x axis is aligned with the heading of the aircraft. t may represent remaining amount of time of flight of the aircraft. v may represent nominal aircraft airspeed. $u_{max}$ may represent the maximum turn rate of the aircraft. $w_{max}$ may represent maximum anticipated speed of the wind.

Determining the at least one component of the current gradient may include calculating a projection of the current gradient along a direction that is orthogonal to a direction from the aircraft to the target.

Determining the at least one component of the current gradient of C may include calculating a difference between $$\frac{\partial C}{\partial x} y \text{ and } \frac{\partial C}{\partial y} x.$$

The difference may be calculated accord to $$\frac{\partial C}{\partial x} y - \frac{\partial C}{\partial y} x.$$

The aircraft may be characterized by an amount ($\delta v_{max}$) by which nominal airspeed of the aircraft can be changed while maintaining flight. C may satisfy a partial differential equation of the form:

$$\frac{\partial C}{\partial t} = v \frac{\partial C}{\partial x} - \delta v_{max} \left| \frac{\partial C}{\partial x} \right| - u_{max} \left| \frac{\partial C}{\partial x} y - \frac{\partial C}{\partial y} x \right| + w_{max} \left( \left( \frac{\partial C}{\partial x} \right)^2 + \left( \frac{\partial C}{\partial y} \right)^2 \right)^{\frac{1}{2}}.$$

Optionally, $$\frac{\partial C}{\partial x}$$

may be automatically compared to at least a fourth predetermined value and/or a fifth predetermined value. If $$\frac{\partial C}{\partial x}$$

is found by the comparing to be less than the fourth predetermined value, a fourth signal commanding an increase in airspeed of the aircraft may be automatically sent. If $$\frac{\partial C}{\partial x}$$

is found by the comparing to be greater than the fifth predetermined value, a fifth signal commanding a decrease in airspeed of the aircraft may be automatically sent.

Automatically determining the at least one component of the current gradient of C may include selecting a table from a plurality of tables and accessing the selected table. The plurality of tables may store pre-calculated values of partial derivatives of C for a plurality of nominal aircraft airspeeds, a plurality of maximum turn rates and a plurality of uncertainties of speed of the wind. The selecting may be based on the nominal aircraft airspeed, the maximum turn rate of the aircraft and uncertainty of speed of the wind. The selected table may be accessed according to the current coordinates and the current remaining amount of time of flight of the aircraft. The table may store pre-calculated values of the partial derivatives of C for a plurality of current coordinates and a plurality of remaining amounts of time of flight of the aircraft.

Sending the first signal may include sending the first signal commanding a maximum turn of the aircraft in the first direction. Sending the second signal may include sending the second signal commanding a maximum turn of the aircraft in the second direction.

Optionally, if the at least one component of the current gradient is about zero, a third signal commanding straight flight of the aircraft may be sent.

The first predetermined value may be about zero and the second predetermined value may be about zero.

The first predetermined value and the second predetermined value may provide a deadband around zero.

Optionally, if the at least one component of the current gradient is within the deadband, a third signal commanding straight flight of the aircraft may be sent.

Automatically determining the at least one component of the current gradient of C may include accessing a table according to the current coordinates and the current remaining amount of time of flight of the aircraft. The table may store pre-calculated values of partial derivatives of C for a plurality of current coordinates and a plurality of remaining amounts of time of flight of the aircraft.

Accessing the table may include selecting a table of a plurality of tables. The plurality of tables may store pre-calculated values of partial derivatives of C for a plurality of aircraft airspeeds, a plurality of maximum turn rates and a plurality of uncertainties of speed of the wind. The selecting may be based on the aircraft airspeed, the maximum turn rate of the aircraft and uncertainty of speed of the wind.

Automatically determining the at least one component of the current gradient of C may include accessing a table according to the current coordinates and the current remaining amount of time of flight of the aircraft. The table may store pre-calculated partial derivatives of C for a plurality of current coordinates and a plurality of remaining amounts of time of flight of the aircraft.

Automatically determining the at least one component of the current gradient of C may include accessing a table according to the current coordinates and the current remaining amount of time of flight of the aircraft. The table may store pre-calculated projections of gradients, along directions that are orthogonal to directions from the aircraft to the target, for a plurality of current coordinates and a plurality of remaining amounts of time of flight of the aircraft.

Automatically determining the at least one component of the current gradient of C may include, after each time receiving the signals indicating a then-current location of the aircraft, calculating a partial derivative of C according to then-current coordinates and then-current remaining amount of time of flight of the aircraft.

Optionally, the method may also estimate displacement of the aircraft due to the wind and adjust the current coordinates of the aircraft by the estimated displacement of the aircraft, thereby automatically determining adjusted current coordinates of the aircraft.

Optionally, the method may also rotate the adjusted current coordinates of the aircraft, thereby automatically determining rotated adjusted current coordinates of the aircraft, such that an axis of the rotated adjusted current coordinates of the aircraft points in a direction of horizontal current flight of the aircraft.

C may satisfy a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + \delta w_{max}\left(\left(\frac{\partial C}{\partial x}\right)^2 + \left(\frac{\partial C}{\partial y}\right)^2\right)^{\frac{1}{2}},$$

and

The boundary condition may be of the form:

$C(x,y,t)=(x^2+y^2)^{1/2}$ at $t=0$, where:

x and y represent rotated adjusted current coordinates of the aircraft relative to the target, in a frame whose x axis is aligned with the heading of the aircraft. t represents remaining amount of time of flight of the aircraft. v represents nominal aircraft airspeed. $u_{max}$ represents the maximum turn rate of the aircraft. $\delta w_{max}$ represents maximum uncertainty of speed of the wind.

Estimating the displacement of the aircraft due to the wind may include estimating velocity of the wind as a function of altitude and calculating:

$$\Delta r_N = \frac{1}{v_D}\int_{h_{ip}}^{h_{ac}} w_N(h)dh, \text{ and } \Delta r_E = \frac{1}{v_D}\int_{h_{ip}}^{h_{ac}} w_E(h)dh,$$

where:

$\Delta r_N$ represents north position displacement of the aircraft, relative to the location of the target. $\Delta r_E$ represents east position displacement of the aircraft, relative to the location of the target. $v_D$ represents descent rate of the aircraft. $h_{ip}$ represents altitude of the target. $h_{ac}$ represents altitude of the aircraft. $w_N(h)$ represents north component of the velocity of the wind as a function of altitude (h). $w_E(h)$ represents east component of the velocity of the wind as a function of altitude (h).

Estimating the velocity of the wind may include accessing a table according to the altitude of the aircraft. The table may store a plurality of velocities of the wind for a corresponding plurality of altitudes.

Adjusting the current coordinates of the aircraft by the estimated displacement due to the wind and rotating the adjusted current coordinates of the aircraft may include calculating:

$x=+(r_N+\Delta r_N)\cos\psi + (r_E+\Delta r_E)\sin\psi$, and $y=-(r_N+\Delta r_N)\sin\phi + (r_E+\Delta r_E)\cos\psi$, where:

$\psi$ represents the current heading of the aircraft.

Another embodiment of the present invention provides a system for automatically guiding an aircraft. The aircraft is guided toward a target. The aircraft may be guided through wind. The wind may be variable. The aircraft has a maximum turn rate. The system includes a coordinates calculator that receives signals indicating current location of the aircraft. The coordinates calculator automatically generates signals indicating current coordinates of the aircraft, relative to location of the target. A flight time estimator receives signals indicating current altitude of the aircraft and automatically generates signals indicating estimated current remaining amount of time of flight of the aircraft.

A gradient component calculator is coupled to the coordinates calculator and to the flight time estimator. The gradient component calculator automatically generates signals indicating at least one component of a current gradient of function C. C satisfies a partial differential equation and a boundary condition. C represents miss distance as a function of at least current heading of the aircraft, the current coordinates of the aircraft, relative to the target, and the current remaining amount of time of flight of the aircraft.

A first comparator is coupled to the gradient component calculator. The first comparator compares the at least one component of the current gradient of C to a first predetermined value and/or a second predetermined value.

A first signal generator is coupled to the first comparator. The first signal generator generates a first signal commanding a turn of the aircraft in a first direction if the at least one component of the current gradient is found by the first comparator to be less than the first predetermined value.

A second signal generator is coupled to the first comparator. The second signal generator generates a second signal commanding a turn of the aircraft in a second direction, different than the first direction, if the at least one component of the current gradient is found by the first comparator to be greater than the second predetermined value. The first direction may be right, and the second direction may be left.

The coordinates calculator, the flight time estimator, the gradient component calculator, the first comparator, the first signal generator and the second signal generator operate repeatedly until the current remaining amount of time of flight of the aircraft is less than a third predetermined value.

The aircraft may be characterized by an amount by which its airspeed can be changed while maintaining flight. C may take into account the amount by which the aircraft airspeed can be changed.

C may satisfy a Hamilton-Jacobi partial differential equation.

C may satisfy a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}},$$

and

The boundary condition may be of the form:

$C(x,y,t)=(x^2+y^2)^{1/2}$ at $t=0$, where:

x and y represent coordinates of the aircraft relative to the target, in a frame whose x axis is aligned with the heading of the aircraft. t represents remaining amount of time of flight of the aircraft. v represents nominal aircraft airspeed. $u_{max}$ represents the maximum turn rate of the aircraft. $w_{max}$ represents maximum anticipated speed of the wind.

The at least one component of the current gradient may include a projection of the current gradient along a direction that is orthogonal to a direction from the aircraft to the target.

The at least one component of the current gradient of C may include a difference between $$\frac{\partial C}{\partial x}y \text{ and } \frac{\partial C}{\partial y}x.$$

The difference may be calculated accord to $$\frac{\partial C}{\partial x}y - \frac{\partial C}{\partial y}x.$$

The aircraft may be characterized by an amount ($\delta v_{max}$) by which nominal airspeed of the aircraft can be changed while maintaining flight. C may satisfy a partial differential equation of the form:

$$\frac{\partial C}{\partial t} = v\frac{\partial C}{\partial x} - \delta v_{max}\left|\frac{\partial C}{\partial x}\right| - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}}.$$

The system may also include a differentiator coupled to the gradient component calculator. The differentiator may automatically generate signals indicating a partial derivative $$\frac{\partial C}{\partial x}.$$

A second comparator may be coupled to the differentiator. The second comparator may compare the partial derivative to a fourth predetermined value and/or a fifth predetermined value. A fourth signal generator may be coupled to the second comparator. The fourth signal generator may generate a fourth signal commanding an increase in airspeed of the aircraft if the partial derivative is found by the second comparator to be less than the fourth predetermined value. A fifth signal generator may be coupled to the second comparator. The fifth signal generator may generate a fifth signal commanding a decrease in airspeed of the aircraft if the partial derivative is found by the second comparator to be greater than the fifth predetermined value.

The system may also include a memory storing a plurality of tables. The tables may store pre-calculated values of partial derivatives of C for a plurality of nominal aircraft airspeeds, a plurality of maximum turn rates and a plurality of uncertainties of speed of the wind. A table selector may be coupled to the memory and to the gradient component calculator. The table selector may select a table from the plurality of tables. The selection may be based on the nominal aircraft airspeed, the maximum turn rate of the aircraft and uncertainty of speed of the wind.

A table entry selector may be coupled to the table selector, to the memory and to the gradient component calculator. The table entry selector may access the selected table according to the current coordinates and the current remaining amount of time of flight of the aircraft. The table may store pre-calculated values of partial derivatives of C for a plurality of current coordinates and a plurality of remaining amounts of time of flight of the aircraft. The table entry selector may provide values from the selected table to the gradient component calculator. The gradient component calculator may use the provided values to automatically generate the signals indicating the at least one component of a current gradient of function C.

The first signal may command a maximum turn of the aircraft in the first direction. The second signal may command a maximum turn of the aircraft in the second direction.

The system may also include a third signal generator coupled to the first comparator. If the at least one component of the current gradient is found by the first comparator to be about zero, the third signal generator may generate a third signal. The third signal may command a straight flight of the aircraft.

The first predetermined value may be about zero, and the second predetermined value may be about zero.

The first predetermined value and the second predetermined value may provide a deadband around zero.

The system may also include a third signal generator. The third signal generator may be coupled to the first comparator. If the at least one component of the current gradient is found by the first comparator to be within the deadband, the third signal generator may generate a third signal. The third signal may command a straight flight of the aircraft.

The system may also include a memory storing a table. The table may store pre-calculated values of partial derivatives of C for a plurality of current coordinates and a plurality of remaining amounts of time of flight of the aircraft. A table entry selector may be coupled to the memory and to the gradient component calculator. The table entry selector may access the table according to the current coordinates and the current remaining amount of time of flight of the aircraft. The table entry selector may provide values from the table to the gradient component calculator. The gradient component calculator may use the provided values to automatically generate the signals indicating the at least one component of a current gradient of function C.

The memory may store a plurality of tables. The plurality of tables may store pre-calculated values of partial derivatives of C for a plurality of aircraft airspeeds, a plurality of maximum turn rates and a plurality of uncertainties of speed of the wind. The system may further include a table selector coupled to the memory, to the table entry selector and to the gradient component calculator. The table selector may select a table from the plurality of tables. The selection may be based on the aircraft airspeed, the maximum turn rate of the aircraft and uncertainty of speed of the wind.

The system may also include a memory storing a table. The table may store pre-calculated partial derivatives of C for a plurality of current coordinates and a plurality of remaining amounts of time of flight of the aircraft. A table entry selector may be coupled to the memory and to the gradient component calculator. The table entry selector may access the table. The selection may be according to the current coordinates and the current remaining amount of time of flight of the aircraft. The table entry selector may provide values from the table to the gradient component calculator. The gradient component calculator may use the provided values to automatically generate the signals indicating the at least one component of a current gradient of function C.

The system may also include a memory storing a table. The table may store pre-calculated projections of gradients. The projections of the gradients may be along directions that are orthogonal to directions from the aircraft to the target, for a plurality of current coordinates and a plurality of remaining amounts of time of flight of the aircraft. A table entry selector may be coupled to the memory and to the gradient component calculator. The table entry selector may access the table according to the current coordinates and the current remaining amount of time of flight of the aircraft. The table entry selector may provide values from the table to the gradient component calculator. The gradient component calculator may use the provided values to automatically generate the signals indicating the at least one component of a current gradient of function C.

The gradient component calculator may calculate a value of C according to then-current coordinates and then-current remaining amount of time of flight of the aircraft after each time the coordinates calculator receives the signals indicating the current location of the aircraft.

The system may also include a wind displacement estimator. The wind displacement estimator estimates displacement of the aircraft due to the wind. A coordinates adjuster may be coupled to the wind displacement estimator and to the gradient component calculator. The coordinates adjuster may adjust the current coordinates of the aircraft by the estimated displacement of the aircraft, thereby automatically determining adjusted current coordinates of the aircraft.

The system may also include a coordinate rotator coupled to the wind displacement estimator and to the coordinate adjuster. The coordinates rotator may rotate the adjusted current coordinates of the aircraft, thereby automatically determining rotated adjusted current coordinates of the aircraft. The rotated adjusted current coordinates of the aircraft may be automatically determined such that an axis of the rotated adjusted current coordinates of the aircraft points in a direction of horizontal current flight of the aircraft.

C may satisfy a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + \delta w_{max}\left(\left(\frac{\partial C}{\partial x}\right)^2 + \left(\frac{\partial C}{\partial y}\right)^2\right)^{\frac{1}{2}},$$

and

The boundary condition may be of the form:

$C(x,y,t) = (x^2+y^2)^{1/2}$ at $t=0$, where:

x and y represent rotated adjusted current coordinates of the aircraft relative to the target, in a frame whose x axis is aligned with the heading of the aircraft. t represents remaining amount of time of flight of the aircraft. v represents nominal aircraft airspeed. $u_{max}$ represents the maximum turn rate of the aircraft. $\delta w_{max}$ represents maximum uncertainty of speed of the wind.

The wind displacement estimator may estimate velocity of the wind as a function of altitude. The wind displacement estimator may calculate:

$$\Delta r_N = \frac{1}{v_D}\int_{h_{ip}}^{h_{ac}} w_N(h)\,dh, \text{ and } \Delta r_E = \frac{1}{v_D}\int_{h_{ip}}^{h_{ac}} w_E(h)\,dh,$$

where:

$\Delta r_N$ represents north position displacement of the aircraft, relative to the location of the target. $\Delta r_E$ represents east position displacement of the aircraft, relative to the location of the target. $v_D$ represents descent rate of the aircraft. $h_{ip}$ represents altitude of the target. $h_{ac}$ represents altitude of the aircraft. $w_N$ (h) represents north component of the velocity of the wind as a function of altitude (h). $w_E$ (h) represents east component of the velocity of the wind as a function of altitude (h).

The system may also include a memory storing a table. The table may store a plurality of velocities of the wind for a corresponding plurality of altitudes. A table entry selector may be coupled to the memory and to the wind displacement estimator. The table entry selector may access the table according to the altitude of the aircraft. The table entry selector may provide a value from the table to the wind displacement estimator.

The coordinate rotator and the coordinate adjuster may rotate the adjusted current coordinates of the aircraft by calculating:

$x = +(r_N+\Delta r_N)\cos \phi + (r_E+\Delta r_E)\sin \phi$, and $y = -(r_N+\Delta r_N)\sin \phi + (r_E+\Delta r_E)\cos \phi$, where:

ψ represents the current heading of the aircraft.

Yet another embodiment of the present invention provides a non-transitory computer-readable medium. The medium is encoded with instructions. When the instructions are executed by a processor, the instructions establish processes for performing a computer-implemented method. The method provides automatic guidance of an aircraft. The aircraft is guided toward a target. The aircraft may be guided through wind. The wind may be variable. The aircraft has a maximum turn rate.

The processes include: (a) Receiving signals indicating current location, current altitude and current heading of the aircraft. (b) From the signals indicating the current location of the aircraft, automatically calculating current coordinates of the aircraft, relative to location of the target. (c) From the signals indicating the current altitude of the aircraft, automatically estimating current remaining amount of time of flight of the aircraft.

(d) Automatically determining at least one component of a current gradient of function C. C satisfies a partial differential equation and a boundary condition. C represents miss distance as a function of at least the current heading of the aircraft, the current coordinates of the aircraft, relative to the location of the target, and the current remaining amount of time of flight of the aircraft.

(e) Automatically comparing the at least one component of the current gradient to a first predetermined value and/or a second predetermined value. (f) If the at least one component of the current gradient is found by the comparing to be less than the first predetermined value, automatically sending a first signal commanding a turn of the aircraft in a first direction. (g) If the at least one component of the current gradient is found by the comparing to be greater than the second predetermined value, automatically sending a second signal commanding a turn of the aircraft in a second direction opposite the first direction. The first direction may be right, and the second direction may be left.

(h) Repeating (a)-(g) until the current remaining amount of time of flight of the aircraft is less than a third predetermined value.

The processes may also include one or more of the operations described above, with respect to the method for automatically guiding an aircraft.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
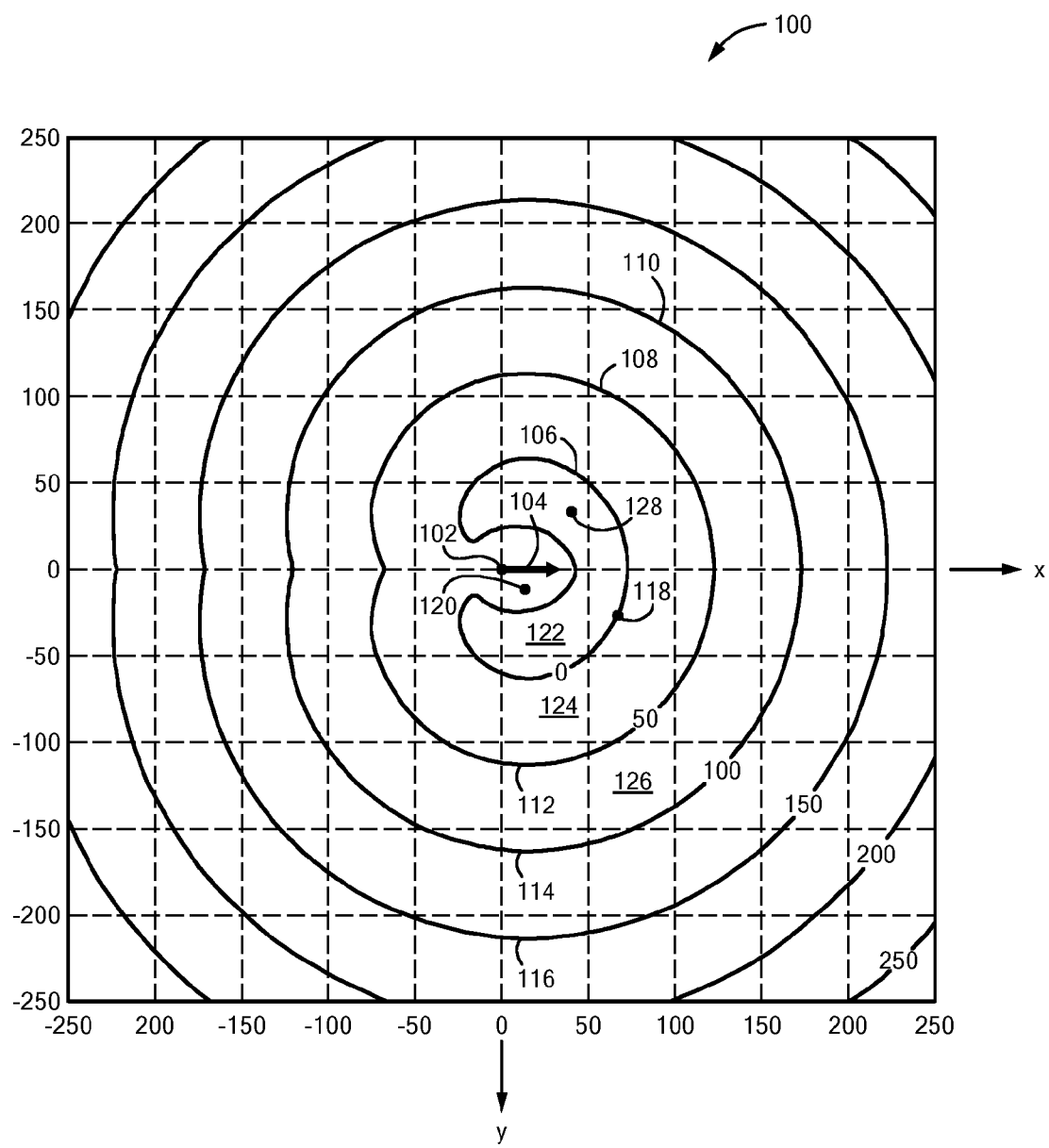
FIG. 1 is a plot of function C for a hypothetical aircraft, such as a parafoil, with 30 seconds of flight time remaining, according to an embodiment of the present invention.

In accordance with embodiments of the present invention, methods and apparatus are disclosed for guiding an aircraft based on a special partial differential equation (PDE). The system does not depend on a predetermined desired flight path. Wind is unpredictable and can vary in speed and direction over the course of a flight, thereby rendering predetermined flight path systems inaccurate. Guidance systems and methods according to the present invention effectively repeatedly determine the worst landing the wind can cause and issue flight control commands that minimize among these worst outcomes.

A function C that satisfies the PDE calculates smallest miss distance a guidance system can bring about by appropriately steering an aircraft, given the aircraft's current heading, current location relative to a target and current remaining amount of time to fly. The system repeatedly uses the function C to calculate and issue flight control commands, such as turn commands, to minimize the miss distance. As noted, the system does not depend on a predetermined desired flight path.

The function $C(x, y, t)$ satisfies a Hamilton-Jacobi PDE of the form:

$$\frac{\partial C}{\partial t} = \qquad (1)$$

$$v\frac{\partial C}{\partial x} - \delta v_{max}\left|\frac{\partial C}{\partial x}\right| - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}}$$

with a boundary condition:

$$C(x,y,0)=(x^2+y^2)^{1/2} \qquad (2)$$

where the x and y represent current location of the aircraft, relative to the target, in a frame whose x axis is aligned with heading of the aircraft, and t represents current remaining amount of flight time. Parameters of the Hamilton-Jacobi PDE are described in Table 1.

TABLE 1

Parameters for Hamilton-Jacobi PDE

| Symbol | Meaning |
|---|---|
| v | Nominal horizontal airspeed of the aircraft |
| $\delta v_{max}$ | Amount by which the aircraft's nominal airspeed can be changed while maintaining flight (if the airspeed is adjustable) |

TABLE 1-continued

Parameters for Hamilton-Jacobi PDE

| Symbol | Meaning |
|---|---|
| $u_{max}$ | Maximum turn rate of the aircraft |
| $w_{max}$ | Maximum anticipated speed of the wind |

For simplicity, embodiments of the present invention are described in relation to unpowered aircraft, such as parafoils, with relatively constant descent rates. However, these descriptions can be altered to be relevant to powered aircraft, including powered aircraft with fixed descent rates, and/or aircraft with variable descent rates, such as discussed herein. Altitudes discussed herein are assumed to be above mean sea level (MSL), rather than above ground, although with suitable adjustments, altitudes above ground or measured against any other reference level may be used. Cartesian coordinates are used for simplicity. However, other coordinate systems, such as polar coordinates, may be used with suitable modifications to equations and descriptions, as discussed herein or as are within the abilities of one of ordinary skill in the art. Other terms used herein are defined near the end of this section.

Remaining Flight Time

Given an aircraft's altitude and descent rate, an amount of flight time remaining (T) before landing can be calculated or estimated, such as according to equation (3):

$$T = \frac{1}{v_D}(h_{ac} - h_{ip}), \qquad (3)$$

where the parameters of equation (3) are described in Table 2.

TABLE 2

Remaining Flight Time Estimation Parameters

| Symbol | Meaning |
|---|---|
| $v_D$ | Descent rate of the aircraft |
| $h_{ac}$ | Altitude of the aircraft |
| $h_{ip}$ | Altitude of the target |

Function C Calculates Smallest Miss Distance Given Current Circumstances

As noted, the function $C(x, y, t)$ returns the smallest miss distance guidance can bring about, given an aircraft's current heading, current location relative to a target and current remaining amount of time to fly. In one embodiment, x and y represent Cartesian coordinates of the aircraft relative to the target, in a right-handed reference frame whose x axis is aligned with the heading of the aircraft, the y axis is orthogonal to the x and z axes and the z axis points down. The parameter t represents current remaining amount of flight time. In other embodiments, other coordinates, such as target relative to aircraft, or other coordinate systems, such as polar, or other time bases, such as cumulative time of flight, may be used with appropriate modifications to equations described herein.

FIG. 1 is a plot 100 of the function C for a hypothetical aircraft, such as a parafoil, with 30 seconds of flight time remaining. The aircraft is assumed to be characterized by a hypothetical descent rate ($v_D$) and maximum turn rate ($u_{max}$), and the air is assumed to be calm, i.e., no wind ($w_{max}$=0). The plot is drawn such that the aircraft is located at coordinates (0, 0), as indicated at 102, and the aircraft is flying in the direction of the x axis, as indicated by arrow 104. In examples where the wind is non-zero, the plot is drawn such that the x axis corresponds with the horizontal component of the aircraft velocity, with respect to air. The arrow 104 is not drawn to scale. The target can be located anywhere on the plot.

Each closed line (loop), exemplified by closed lines 106, 108 and 110, represents a set of locations, to which guidance can bring about equal miss distances. Essentially, the lines 106-110 are equal miss distance contour lines of a landing map. The miss distances are shown on the lines, for example at 112, 114 and 116. For example, with 30 seconds of flight time remaining, if the target is anywhere on line 106, for example if the target is located at a point 118, by executing appropriate maneuvers, guidance can cause the aircraft to land directly on the target, i.e., with a miss distance of zero. That is, any point on line 106 is close enough to the aircraft location 102 that guidance has enough time to guide the aircraft so in exactly 30 seconds, the aircraft will be at the target's x-y coordinates and, at the aircraft's descent rate, in 30 seconds the aircraft will land.

However, if the target is located further from the aircraft location 102, for example anywhere on line 108, with only 30 seconds of flight time remaining, guidance cannot cause the aircraft to land on the target. The target is too far from the aircraft. The aircraft will land before reaching the target. By executing appropriate maneuvers, the aircraft will land 50 distance units (as indicated at 112) from the target.

On the other hand, if the target is currently located very close to the aircraft, such as at point 120, yet the aircraft will not land for another 30 seconds, guidance cannot command tight enough turns to remain in the area of the target 120 until the aircraft lands. The aircraft will necessarily miss the target by up to 50 distance units (as indicated at 112).

Each line 106-110 encloses a corresponding area, exemplified by areas 122, 124 and 126. Each area 122-126 represents a set of locations, to which guidance can cause the aircraft to land with a miss distance no better than the enclosing line indicates. For example, with 30 seconds of flight time remaining, if the target is anywhere within area 122, for example if the target is located at a point 128, guidance can cause the aircraft to land directly on the target, i.e., with a miss distance of zero. However, if the target is anywhere within area 124, including point 120, with only 30 seconds of flight time remaining, guidance cannot cause the aircraft to land closer than 50 distance units (as indicated at 112) from the target.

Figure 2:
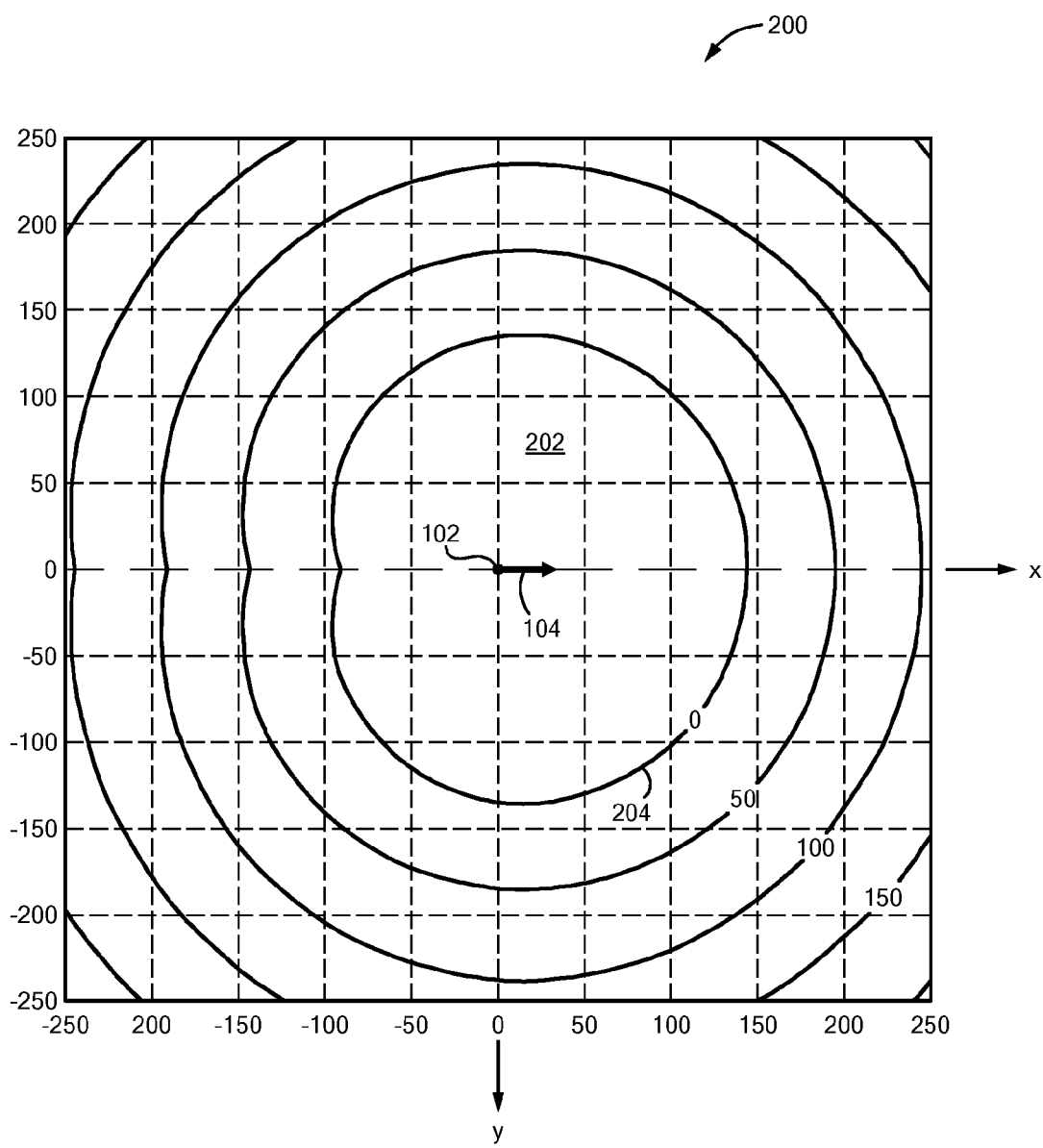
FIG. 2 is a plot of the function C for the same hypothetical aircraft as in FIG. 1, except with 50 seconds of flight time remaining, according to an embodiment of the present invention.

The function C may be used to draw similar plots for other remaining amounts of flight time. If more flight time remains, the area 122 representing zero miss distance is larger, and if less flight time remains, the area 122 is smaller or nonexistent. FIG. 2 is a plot 200 of the function C for the same hypothetical aircraft as in FIG. 1, except with 50 seconds of flight time remaining. With 50 seconds of flight time remaining, the area 202 of zero landing error, i.e., the area within line 204, is larger than the corresponding area 122 in FIG. 1.

Figure 3:
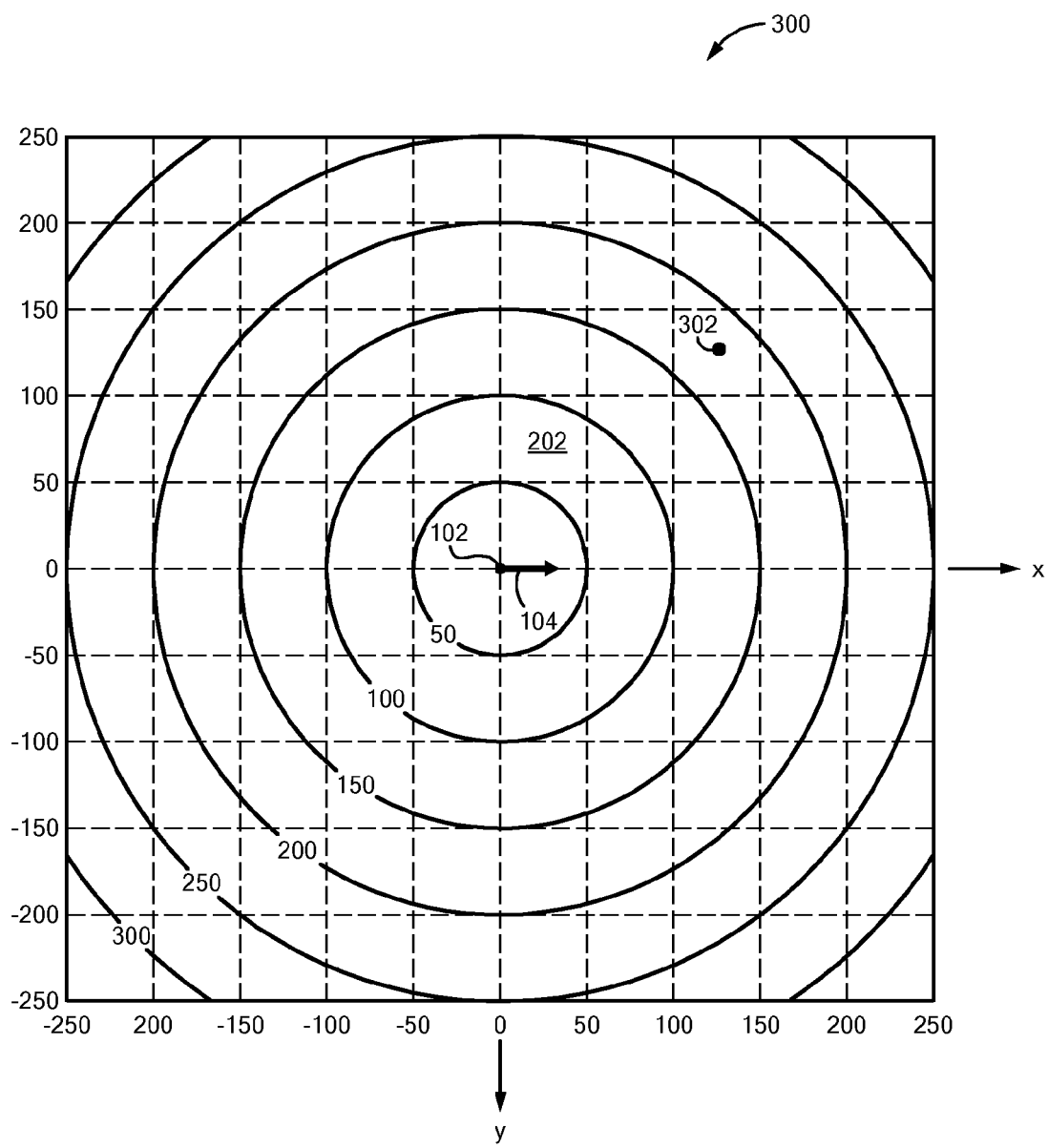
FIG. 3 is a plot of the function C for the same hypothetical aircraft as in FIGS. 1 and 2, except with zero flight time remaining, according to an embodiment of the present invention.

FIG. 3 is a plot 300 of the function C for the same hypothetical aircraft as in FIGS. 1 and 2, except with zero flight time remaining, i.e., at a point in time when the aircraft lands. If the target is located at (0, 0), i.e., if the target is located at the same point 102 as the aircraft, the aircraft landed directly on the target, and the miss distance is zero. However, if the target is elsewhere, the aircraft missed the target. For example, if the target is located at a point 302, the aircraft missed the target by between 150 and 200 distance units.

The plot 300 represents the boundary condition of equation (2), where t=0 (no remaining flight time). At this point in time, the miss distance, i.e., C(x, y, 0), is the distance between the aircraft landing location, i.e., (0, 0), and the target, i.e., (x, y).

Parafoils

Figure 4:
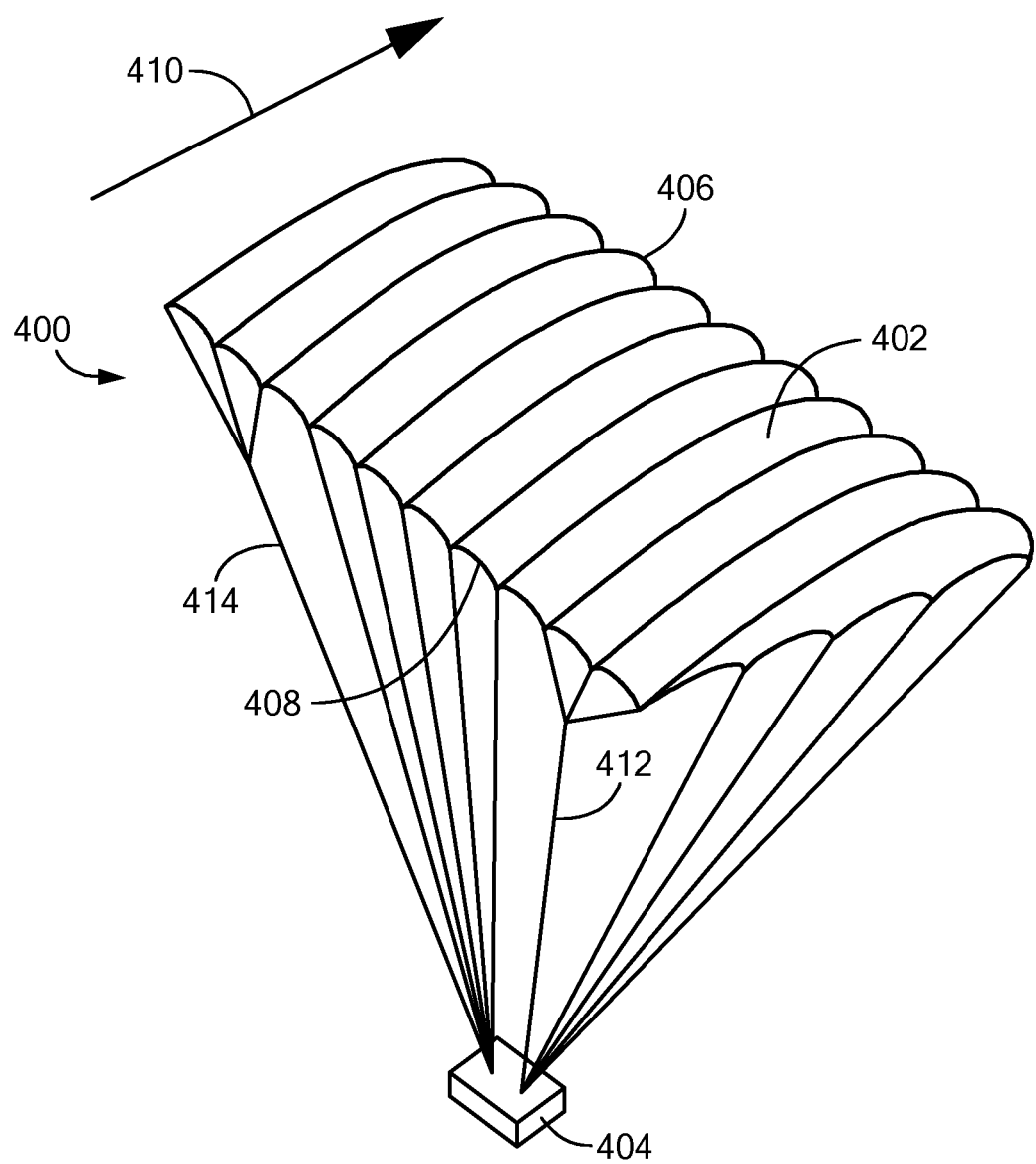
FIG. 4 is an illustration of an exemplary prior art parafoil, coupled to an aircraft guidance, navigation and control (GNC) system (not visible), according to an embodiment of the present invention.

Embodiments of the present invention may be used with parafoils. FIG. 4 is an illustration of an exemplary parafoil 400, including a canopy 402 and various lines, some of which are used to suspend a payload container 404 below the canopy 402. Other of the lines are used to maneuver the parafoil 400. The payload container 404 includes an aircraft guidance system (not visible) according to an embodiment of the present invention. Once inflated, the canopy 402 takes on a shape of an airfoil, with a leading edge 406 and a trailing edge 408. A direction of flight is indicated by an arrow 410.

Brake lines 412 and 414 are attached to portions of the trailing edge 408. The brake lines 412 and 414 are also attached to actuators (not visible), such as reel motors, located in the payload container 404. The actuators are controlled by the aircraft guidance system and operate to selectively lengthen or shorten the brake lines 412 and 414, thereby selectively raising or lowering the corresponding portion of the trailing edge 408. Lowering a portion of the trailing edge 408 increases drag, thereby causing the canopy 402 to turn toward the side with the increased drag. Lowering both portions of the trailing edge 408 by equal amounts increases drag on both sides by equal amounts, thereby decreasing the rate of descent ("flaring") and decreasing the horizontal airspeed ("braking"). Additional or other lines may be used to control other aspects of the canopy 402 shape to affect other aspects of the parafoil's flight.

Although FIG. 4 illustrates a parafoil, other types of powered or unpowered aircraft may be used. Examples include fixed-wing aircraft (gliders, powered airplanes, etc.) and rotary-wing aircraft. In these cases, actuators may be mechanically coupled to flight control surfaces, such as rudders, elevators, ailerons, spoilers, air brakes, etc. or to mechanisms, such as swashplates, that control cyclic rotor blade pitch, collective rotor blade pitch, tail rotor blade pitch, etc. For powered aircraft, actuators may be mechanically coupled to throttles that control speeds of motor-driven propellers or the like. Alternatively, motor speeds may be electronically controlled, rather than via mechanical actuators.

Guidance, Navigation and Control System

Figure 5:
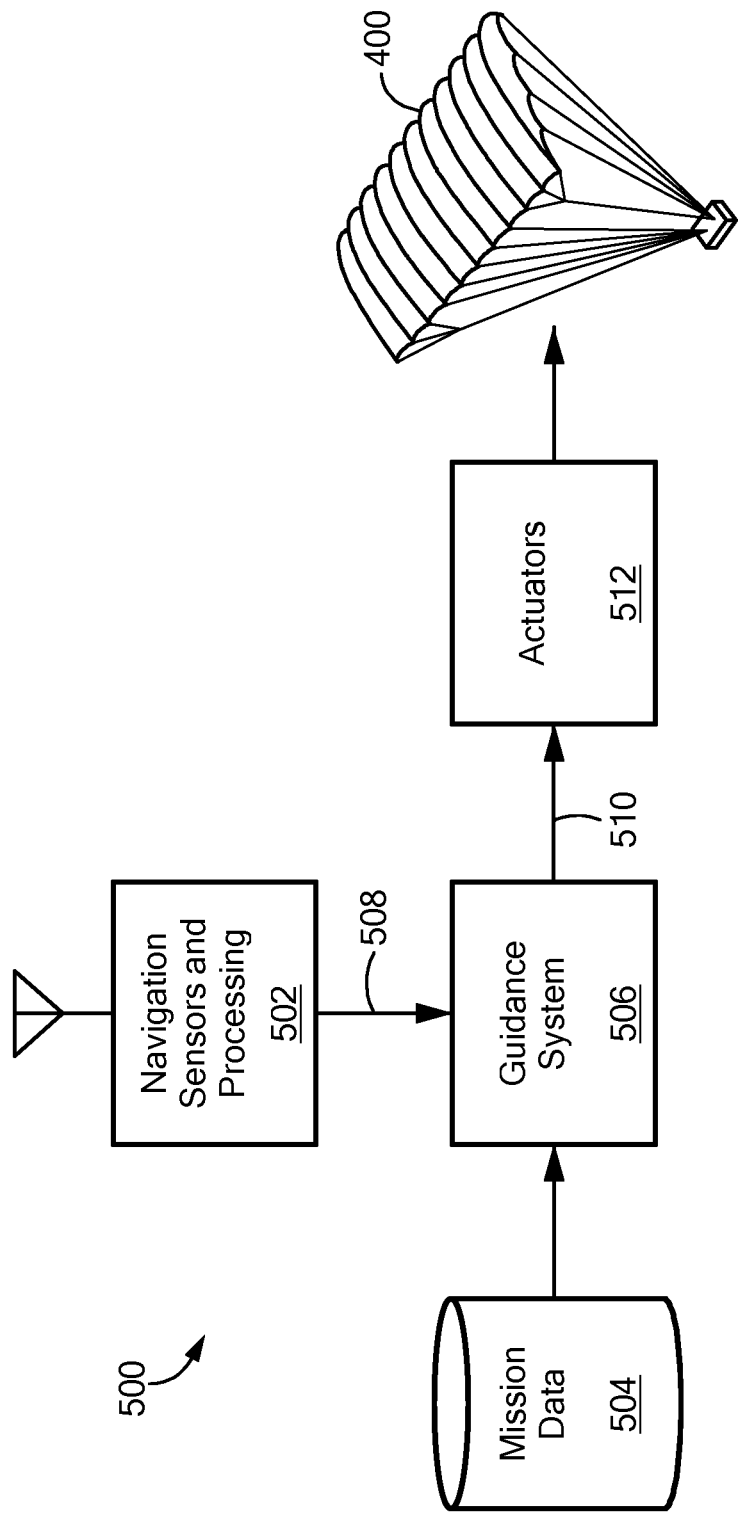
FIG. 5 is a schematic block diagram of the guidance, navigation and control system of FIG. 4, according to an embodiment of the present invention.

FIG. 5 is a schematic block diagram of a guidance, navigation and control (GNC) system 500, according to an embodiment of the present invention. In this embodiment, the GNC system 500 controls a parafoil 400.

The GNC system 500 includes navigation sensors and processing unit 502, such as a global positioning system receiver (GPSr) and appropriate antenna(s). Optionally or alternatively, the navigation sensors and processing unit 502 may include gyroscopes and accelerometers of an inertial navigation system. Optionally or alternatively, the navigation sensors and processing unit 502 may include a wind speed and/or wind direction sensor to detect speed and/or direction of the aircraft, relative to surrounding air. The navigation and processing unit 502 may include additional sensors, such as a magnetic compass.

Mission data 504 is stored in a computer memory, such as flash memory, or other suitable memory or other electronic circuit. The mission data 504 includes mission parameters, such as target location and payload weight. The mission data 504 also includes information about the aircraft, such as maximum turn rate ($u_{max}$), nominal airspeed (v) and nominal descent rate ($v_D$). If airspeed of the aircraft is controllable, such as by lowering both portions of the trailing edge of an airfoil by equal amounts, an air brake and/or a motor-driven propeller, the aircraft information also includes an amount ($\delta v_{max}$) by which the nominal airspeed can be changed while maintaining flight. If airspeed of the aircraft cannot be controlled, $\delta v_{max}$ is zero in the PDE (1), or the term $$\delta v_{max} \left| \frac{\partial C}{\partial x} \right|$$

is omitted from the PDE. The mission data 504 may also include one or more predetermined threshold values that are used in determining whether to command changes to flight parameters, such as commanding left or right turns or increasing or decreasing airspeed.

Optionally, the mission data 504 may include information about the wind. For example, wind speed predictions for various altitudes may be included in the mission data 504. Optionally or alternatively, the wind information may include maximum anticipated speed of the wind ($w_{max}$), optionally for each of several altitudes, and/or a maximum uncertainty ($\delta w_{max}$) of the speed of the wind or of the wind speed predictions.

A guidance system 506 receives navigation signals 508 from the navigation sensors and processing unit 502. In some embodiments, these signals 508 are electronic signals carried by wires. However, in other embodiments, such as integrated units in which GPS receivers and guidance systems 506 share control processors, the signals 508 may be software signals. The signals 508 indicate current location, current altitude and current heading of the aircraft. The current location may be in the form of latitude and longitude, Cartesian coordinates, polar coordinates or any other suitable form and in any suitable units. Similarly, the current altitude may be above MSL, ground or any other suitable reference level and in any suitable units.

Heading of the aircraft means direction of a velocity vector of the aircraft, with respect to surrounding air. Some GPS receivers are capable of outputting current heading. For example, a GPS receiver with two spaced-apart antennas at fixed locations on the aircraft can calculate heading as a result of differences in pseudo-ranges from GPS satellites to the two antennas. A compass can output magnetic heading information, which can be corrected for magnetic declination according to the aircraft's current location.

The heading can also be calculated based on assumptions about, and/or measurements of, airspeed and/or direction of the aircraft and measurements taken while the aircraft maneuvers. For example, wind velocity can be estimated by flying a circular path and comparing GPS-provided ground speeds of the aircraft at various points along the circular path. Subtracting the wind velocity from the aircraft ground velocity gives the aircraft velocity with respect to surrounding air, and the heading is the direction of the velocity with respect to the surrounding air. The heading can be represented in any suitable form, such as angle from north. An airspeed and/or direction sensor may be used to measure speed and/or direction of surrounding air, relative to the aircraft, and this information may be used in the heading calculation.

The guidance system 506 uses the navigation signals 508 and the mission data 504 to automatically calculate current coordinates of the aircraft, relative to the location of the target. Calculations involving the function C can be performed using any desired coordinate system, such as Cartesian coordinates or polar coordinates, with suitable modifications to equations (1) and (2). The guidance system 506 repeatedly automatically determines at least one component of a current gradient of the function C at then-current heading of the aircraft, then-current coordinates of the aircraft, with respect to the location of the target, and then-current remaining amount of flight time. The guidance system 506 compares the result to one or more threshold values included in the mission data 504. If the result meets a criterion involving the threshold value(s), the guidance system 506 issues an appropriate flight control command 510, such as turn left or turn right, to an actuator 512, which lengthens or shortens, as appropriate, the corresponding brake line 412 or 414 of the parafoil 400 to effect a turn.

Figure 6A:
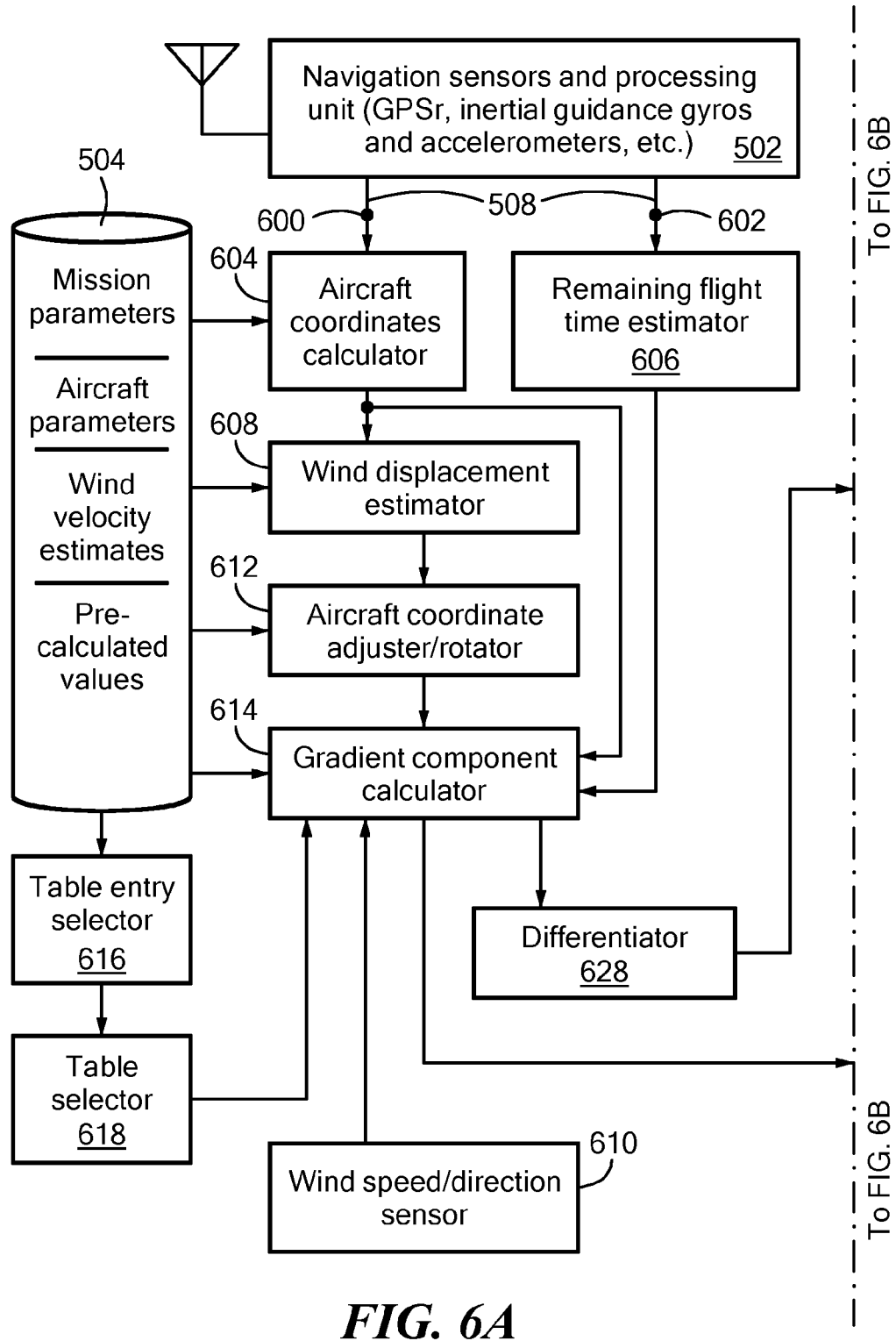
FIGS. 6A and 6B (collectively FIG. 6) contain a schematic block diagram of the guidance system of FIG. 5, according to an embodiment of the present invention.
Figure 6B:
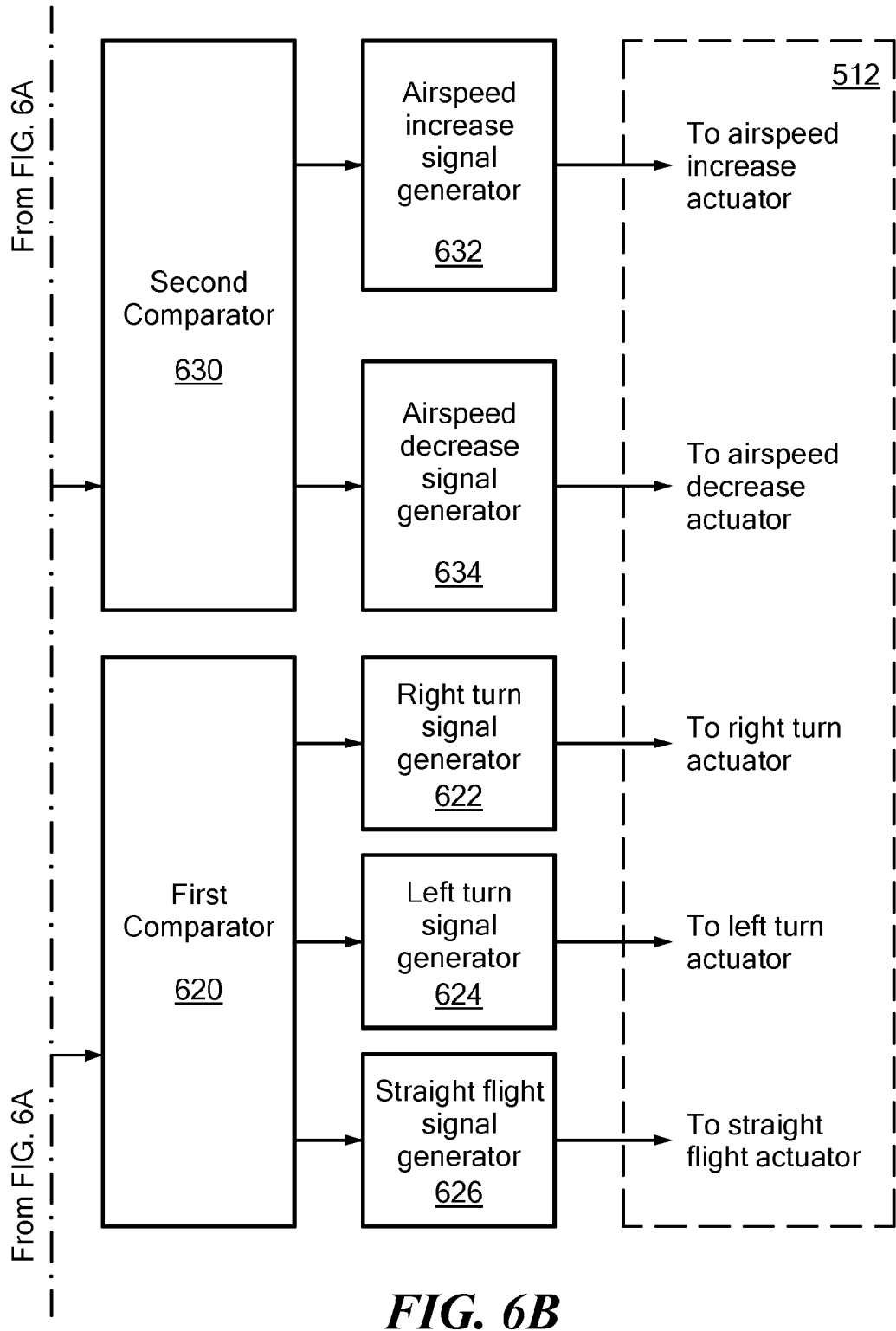

FIGS. 6A and 6B (collectively FIG. 6) contain a schematic block diagram of the guidance system 506. The guidance system 506 receives the navigation signals 508 (FIG. 5) from the navigation sensors and processing unit 502, such as via ports 600 and 602. The current aircraft location and current aircraft heading signals may be received via port 600, and current aircraft altitude signals may be received via port 602.

Aircraft Current Coordinates Calculator

An aircraft current coordinates calculator 604 uses the navigation signals 508 and the mission data 504 to automatically calculate current coordinates of the aircraft, relative to the location of the target. For example, if the aircraft current coordinates are provided by the navigation sensor and processing unit 502 as latitude and longitude, and the location of the target is stored in the mission data 504 as latitude and longitude, the aircraft current coordinates, relative to the target, can be computed by subtracting. The resulting aircraft current coordinates may be converted to Cartesian coordinates, such as distance of the aircraft north of target and distance of the aircraft east of the target, by well-known processes of northing and easting. The current location of the aircraft, as provided by the navigation sensor and processing unit 502, and/or the target location may be converted from one coordinate frame or form to another, as necessary, as part of these calculations.

Remaining Flight Time Estimator

A remaining flight time estimator 606 uses the current aircraft altitude ($h_{ac}$) from the navigation sensor and processing unit 502, and the altitude of the target ($h_{tp}$) and the aircraft descent rate ($v_D$) from the mission data 504, to estimate current remaining flight time (t), such as according to equation (3), discussed above. In situations where the descent rate depends on weight of a payload, the descent rate may be calculated based on the payload weight stored in the mission data 504 and a descent-rate-per-weight factor stored in the mission data 504. Or the descent rate may be estimated from a series of time spaced-apart altitude measurements (for example, $v_D=\Delta$altitude/time between measurements) or from other information from the navigation and processing unit 502.

Wind Displacement and Coordinate Rotation Calculators

Optionally, a wind displacement estimator 608 estimates displacement of the aircraft due to the wind and adjusts the current coordinates of the aircraft by the estimated displacement of the aircraft, thereby automatically determining adjusted current coordinates of the aircraft. Velocity of the wind, relative to the ground, may be estimated before a mission and the estimated velocity may be stored in the mission data 504. Optionally or alternatively, the wind velocity may be estimated by taking GPS ground velocity measurements while flying maneuvers, or the pre-mission wind velocity estimate may be refined using the GPS measurements. The wind velocity measurements or estimates may be refined using data from an airspeed and/or direction sensor 610.

In some embodiments, a single wind velocity estimate is prepared and stored in the mission data 504. In other embodiments, wind velocity is estimated for each of a plurality of altitudes, and these estimated wind velocities are stored in a table in the mission data 504. In these embodiments, the wind displacement estimator 608 accesses the table according to the current altitude of the aircraft. That is, the table of wind velocities may be indexed by the current altitude, sufficiently rounded according to the number of entries in the table and the range of altitudes each entry represents.

The wind displacement estimator 608 may estimate the displacement of the aircraft due to the wind using equations (4) and (5):

$$\Delta r_N = \frac{1}{v_D}\int_{h_{ip}}^{h_{ac}} w_N(h)\,dh \quad (4)$$

$$\Delta r_E = \frac{1}{v_D}\int_{h_{ip}}^{h_{ac}} w_E(h)\,dh \quad (5)$$

where parameters of equations (4) and (5) are described in Table 3.

TABLE 3

Wind Displacement Calculator Parameters

| Symbol | Meaning |
|---|---|
| $\Delta r_N$ | North position displacement of the aircraft, relative to the location of the target |
| $\Delta r_E$ | East position displacement of the aircraft, relative to the location of the target |
| $v_D$ | Descent rate of the aircraft |
| $h_{ip}$ | Altitude of the target |
| $h_{ac}$ | Altitude of the aircraft |
| $w_N(h)$ | North component of the velocity of the wind as a function of altitude (h) |
| $w_E(h)$ | East component of the velocity of the wind as a function of altitude (h) |

In equations (4) and (5), the north and east components of the wind velocity may be stored in two arrays $w_N$ and $w_E$ and indexed by the current altitude h, sufficiently rounded.

Optionally, an aircraft coordinate adjuster/rotator 612 rotates the adjusted current coordinates of the aircraft, thereby automatically determining rotated adjusted current coordinates of the aircraft. This rotation adjusts the coordinate axes so the x axis continues to point in the (wind-rotated) direction of horizontal current flight of the aircraft.

The wind displacement estimator 608 and the aircraft coordinate rotator 612 may adjust and rotate the current coordinates of the aircraft by the estimated wind displacement of the aircraft using equations (6) and (7):

$$x = +(r_N+\Delta r_N)\cos\psi + (r_E+\Delta r_E)\sin\psi \quad (6)$$

$$y = -(r_N+\Delta r_N)\sin\psi + (r_E+\Delta r_E)\cos\psi \quad (7)$$

where $\psi$ represents the current heading of the aircraft, $r_N$ represents north position of the aircraft with respect to the target and $r_E$ represents east position of the aircraft with respect to the target.

Gradient Component Calculator

A gradient component calculator 614 automatically determines at least one component of a current gradient of the function C at the current heading of the aircraft, the current coordinates of the aircraft, with respect to the location of the target, and the current remaining amount of flight time. The gradient component calculator 614 may be thought of as calculating a projection of the current gradient along a direction that is orthogonal to a direction from the aircraft to the target. A component of the gradient of C may be calculated according to equation (8):

$$\frac{\partial C}{\partial x}y - \frac{\partial C}{\partial y}x \quad (8)$$

Equation (8) is parameterized using x and y to represent the current location of the aircraft, with respect to the target. These x and y parameters may be Cartesian coordinates, north-east coordinates or, as noted, coordinates according to another coordinate system, such as north and east coordinates, relative to the target, or polar coordinates, as long as the coordinate system is used consistently in equation (8). That is, the coordinate system used for the current location of the aircraft, i.e., x and y, must be the same as the coordinate system used in the denominators of the partial derivatives, i.e., for the parameters, with respect to which the partial derivatives are taken, ex., x in $\partial x$ and y in $\partial y$.

The gradient component may be calculated in real time, i.e., as the aircraft flies. Optionally or alternatively, some or all values of gradient components may pre-calculated for various combinations of coordinates of the aircraft, relative to the target, and remaining flight times, optionally for various combinations of wind speeds, uncertainties in wind speed, amounts by which the aircraft's nominal airspeed can be changed while maintaining flight (if the airspeed is adjustable), maximum aircraft turn rates, etc. These pre-calculated values may be stored in one or more tables in a memory, such as the mission data 504. If multiple tables are stored, an appropriate one or more of the tables may be selected by a table selector 616 at the beginning of a mission or while the aircraft flies, based on then-current conditions. The tables may be accessed while the aircraft flies, and the pre-calculated values may be fetched from the tables by a table entry selector 618. The fetched values may be used as described herein. Some embodiments may use a combination of tables and real-time calculated values.

Similarly, in addition to, or instead of, calculating or storing gradient component values, values of partial derivatives, such as ∂C/∂x and ∂C/∂y, may be calculated in real time or stored in tables.

Pre-Calculated Table Values

Tables of pre-calculated values of C(x, y, t) may be constructed starting from t=0, where the values of C(x, y, 0) are known or easily calculated, as discussed with respect to FIG. 3 and equation (2). Values of C for other remaining amounts of flight time (t) may be pre-calculated using a Hamilton-Jacobi PDE of the form of equation (1), and the values may be pre-stored in the tables. Then, in real time, partial derivatives of C may be computed numerically, using two or more of the pre-calculated values of C, to compute each partial derivative.

Optionally or alternatively, the tables may be constructed with pre-calculated values of partial derivatives of C. For example, in situations where both airspeed and turn rate of the aircraft are controlled, pre-calculated values of ∂C/∂x and ∂C/∂y may be stored in the tables, and the component of the gradient may be computed in real time using equation (8). In situations where airspeed of the aircraft is not controlled, the tables may be constructed with pre-calculated values of equation (8). Other sets of pre-calculated values may be stored in the tables and, if necessary, values may be calculated from these pre-stored values in real time.

Gradient Component Comparator

If equation (8) evaluates to less than zero, a first comparator 620 commands a right turn, and if equation (8) evaluates to more than zero, the first comparator 620 commands a left turn. However, to prevent chatter between the turn commands, the first comparator 620 may use a deadband around zero. For example, the first comparator 620 may compare the result of the gradient component calculator 614 to one or more threshold values included in the mission data 504 to automatically determine whether to issue a flight control command, such as turn left or turn right.

If the result meets one of the threshold value criteria, a right turn signal generator 622 generates a first signal commanding a right turn of the aircraft or a left turn signal generator 624 generates a second signal commanding a left turn of the aircraft, as appropriate. The right and left turn command signals drive respective right and left actuators 512, which lengthen or shorten the corresponding brake line 412 or 414 of the parafoil 400 to effect a turn.

In some embodiments, turn commands include a turn rate that ranges from about zero to about the aircraft's maximum turn rate. In such embodiments, an amount by which the brake line 412 or 414 is lengthened or shortened depends on a turn rate calculated by the first comparator 620. In some embodiments, all turn commands involve maximum rate turns. In such embodiments, for all turns, the first comparator 620 generates turn command signals that command the maximum turn rate for the aircraft.

In one embodiment, if the result of equation (8) is negative, a right turn command signal is generated, if the result of equation (8) is positive, a left turn command signal is generated and if the result of equation (8) is zero, no turn command signal is generated, i.e., the aircraft is commanded, at least implicitly, to fly straight. In some cases, no specific command signal is necessary to fly straight. For example, in some cases, simple absence of a left or right turn command signal returns the aircraft to straight flight. However, in some cases, an explicit "fly straight" command signal is needed to reset an actuator to a "no turn" position or to activate some other actuator to return the aircraft to straight flight. In this case, a straight flight signal generator 626 generates a straight flight command signal to a straight flight actuator or to reset one of the turn actuators 512.

When the aircraft is flying generally straight, very small deviations above and below zero in the result of equation (8) could cause chatter between the turn command signals, i.e., rapid alternations between generating the left and right turn command signals. To avoid chatter, the threshold values used by the first comparator 620 may define a deadband in which no turn command signal is generated or a "fly straight" command is generated. This deadband may be expressed in many equivalent ways.

In an embodiment, the comparator 620 uses equation (9) to determine which flight command signal, if any, should be issued:

$$u_{cmd} = \begin{cases} u_{max} & \text{if } \frac{\partial C}{\partial x}y - \frac{\partial C}{\partial y}x < -\varepsilon_u \\ 0 & \text{if } -\varepsilon_u \leq \frac{\partial C}{\partial x}y - \frac{\partial C}{\partial y}x \leq +\varepsilon_u \\ -u_{max} & \text{if } +\varepsilon_u < \frac{\partial C}{\partial x}y - \frac{\partial C}{\partial y}x \end{cases} \quad (9)$$

Parameters of equation (9) are described in Table 4.

TABLE 4

Component Comparator Parameters

| Symbol | Meaning |
| --- | --- |
| $U_{cmd}$ | Flight command signal generated |
| $u_{max}$ | Maximum heading rate (maximum turn rate) of the aircraft |
| $\varepsilon_u$ | Heading rate deadband definition parameter |

Thus, if the result of equation (8) is between $-\varepsilon_u$ and $+\varepsilon_u$, i.e., the result of equation (8) is in the deadband, the comparator 620 commands straight flight ($u_{cmd}=0$). If the result of equation (8) is less than $-\varepsilon_u$, the comparator 620 commands a maximum right turn, and if the result of equation (8) is greater than $+\varepsilon_u$, the comparator 620 commands a maximum left turn.

As discussed with respect to equations (8) and (9), if the result of equation (8) is less than the predetermined value, a right turn is commanded. However, with suitable changes to the coordinate system, a less-than-the-predetermined-value result can indicate a left turn, rather than a right turn, is to be commanded. Thus, whether a left or right turn is commanded may be based on a choice of coordinate system. Alternatively, equation (8) can be rewritten as $$\frac{\partial C}{\partial y}x - \frac{\partial C}{\partial x}y$$

to reverse the sense of the comparison that produces the left and right turn commands. For purposes of this application and the appended claims, these modifications are defined as being equivalent, such as for purposes related to the doctrine of equivalence. Left and right turns are defined herein as being in opposite directions.

In an embodiment, the deadband encompasses a range equivalent to about +0.5 degrees of angle between the gradient component calculated by equation (8) and the direction from the aircraft to the target. In other words, if the aircraft is within about 0.5 degrees of the best heading, no left or right turn is commanded.

In an embodiment, a ratio of equation (8) to a product of: (a) the length of the gradient component and (b) the distance from the aircraft to the target may be considered to be a sine of an angle ($\alpha$), as expressed in equation (10):

$$\frac{\frac{\partial C}{\partial x}y - \frac{\partial C}{\partial y}x}{\sqrt{x^2+y^2}\sqrt{\left(\frac{\partial C}{\partial x}\right)^2+\left(\frac{\partial C}{\partial y}\right)^2}} = \sin\alpha \quad (10)$$

If the absolute value of the left side of equation (10) is greater than sin (0.5°), a turn should be commanded. The sign of sin $\alpha$ may be used to determine whether a right or left turn should be commanded.

Because the various ways of determining whether the evaluation of equation (8) can be derived from each other by suitable mathematical manipulations, for purposes of this application and the appended claims, these ways are defined as being equivalent, such as for purposes related to the doctrine of equivalents.

Airspeed Controller

Some aircraft include mechanisms for controlling airspeed. For example, shortening both brake lines 412 and 414 of a parafoil decreases horizontal airspeed. Optionally or alternatively, an aircraft may be equipped with an airbrake. Powered aircraft may be equipped with a mechanical or electronic throttle. When used with such aircraft, embodiments of the present invention may command adjustments to the airspeed. In some such embodiments, a differentiator 628 calculates a partial derivative according to equation (11):

$$\frac{\partial C}{\partial x} \quad (11)$$

and a second comparator 630 generates an airspeed adjustment command according to equation (12):

$$\delta v = \begin{cases} \delta v_{max} & \text{if } \frac{\partial C}{\partial x} < -\varepsilon_{\delta v} \\ 0 & \text{if } -\varepsilon_{\delta v} \leq \frac{\partial C}{\partial x} \leq +\varepsilon_{\delta v} \\ -\delta v_{max} & \text{if } +\varepsilon_{\delta v} < \frac{\partial C}{\partial x} \end{cases} \quad (12)$$

where $\delta v$ is an airspeed adjustment amount, $\delta v_{max}$ is a maximum amount by which the nominal airspeed of the aircraft can be changed while maintaining flight and $\varepsilon_{\delta v}$ is an airspeed adjustment deadband definition parameter. Essentially, if $$\frac{\partial C}{\partial x}$$

is less than $-\varepsilon_{\delta v}$, the aircraft should fly as fast as possible along its current heading, because doing so reduces miss distance. On the other hand, if $$\frac{\partial C}{\partial x}$$

is greater than $+\varepsilon_{\delta v}$, continuing to fly in the current heading worsens the miss distance, so the aircraft should reduce its speed as much as possible. An airspeed adjustment command may be calculated according to equation (13):

$$v_{cmd} = v + \delta v \quad (13)$$

where v is the nominal aircraft airspeed and $v_{cmd}$ is a speed to which the aircraft is commanded to fly.

If the second comparator 630 commands a change in the airspeed, an airspeed increase signal generator 632 or an airspeed decrease signal generator 634 generates an appropriate signal to drive an actuator 512, electronic throttle or the like. In an aircraft having a mechanical throttle, the actuator 512 may be mechanically coupled to the throttle.

The partial derivatives in equations (9), (11) and (12) are evaluated at x, y and T given in equations (6), (7) and (3), respectively.

Implementation

All or some of the components 604-608, 612-620 and 628-630 may be implemented by a processor executing instructions stored in a memory. Optionally or alternatively, all or some of these components may be implemented by hardware, such as field-programmable gate arrays (FPGAs), combinatorial logic, analog circuits, hybrid circuits, etc. In some embodiments, a combination of one or more processors and one or more hardware components are used to implement the components 604-608, 612-620 and 628-630.

Guidance, Navigation and Control System Flowcharts

Figure 7A:
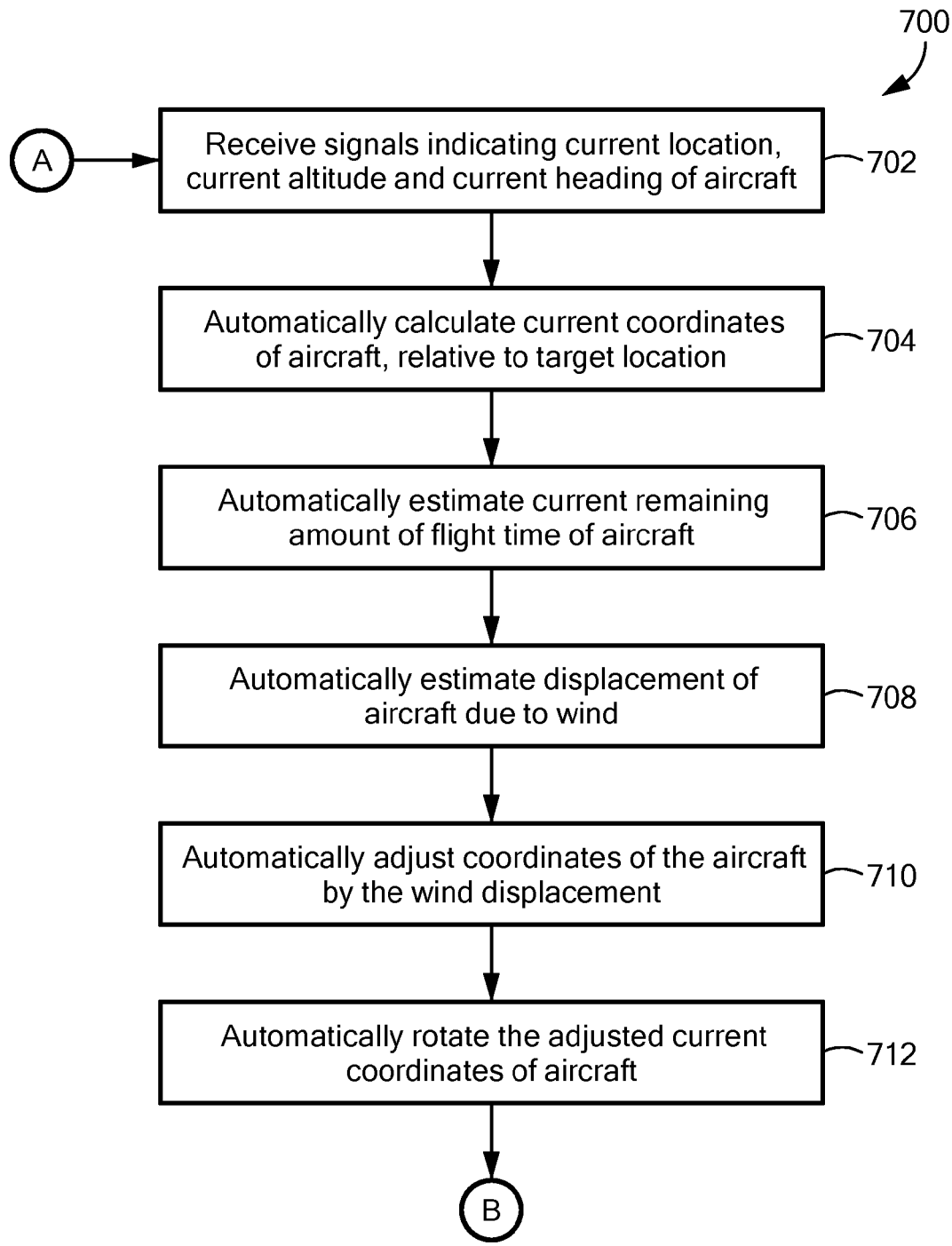
FIGS. 7A, 7B and 7C (collectively FIG. 7) contain a flowchart schematically illustrating operations performed by an embodiment of the present invention.
Figure 7B:
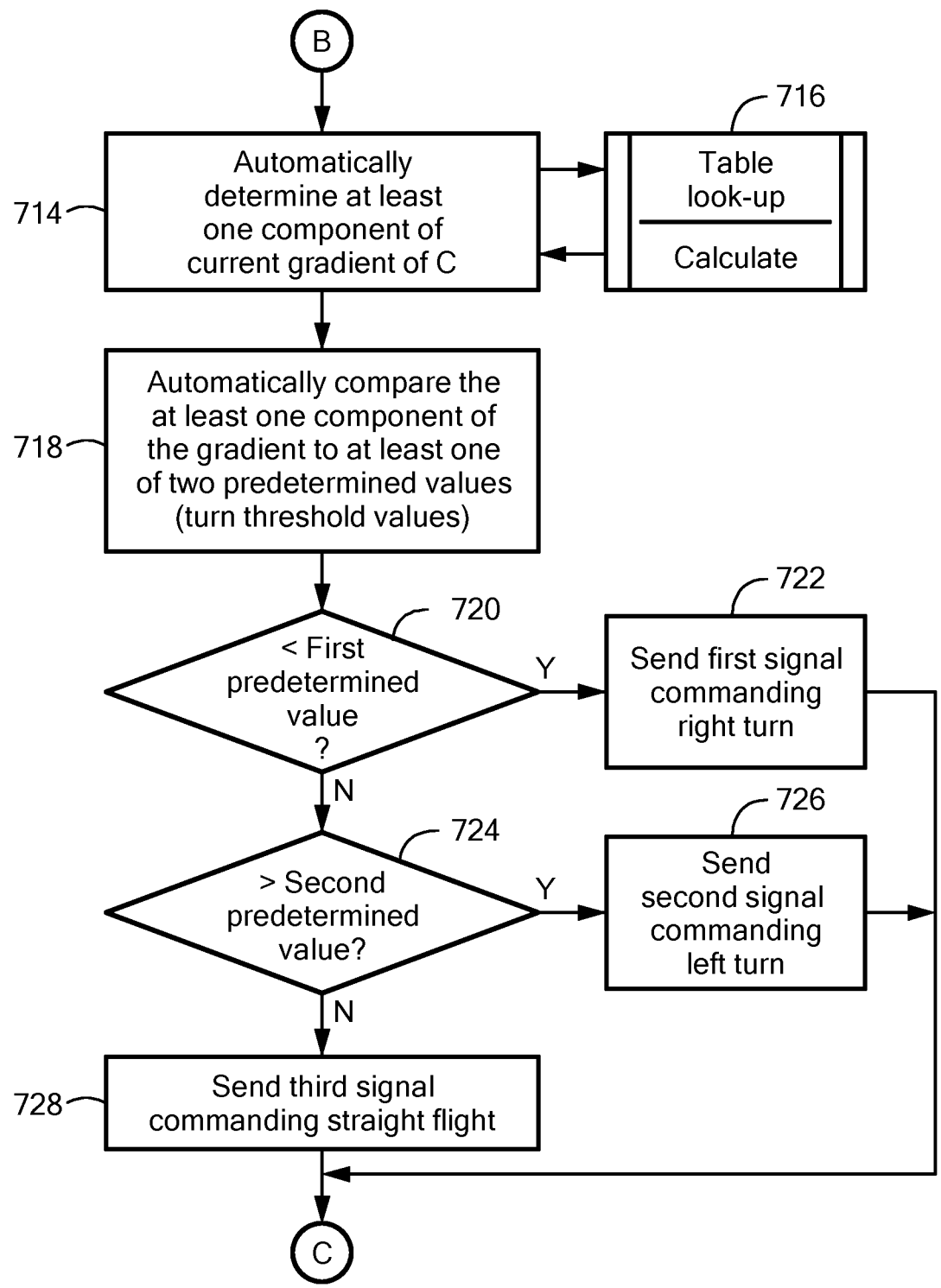
Figure 7C:
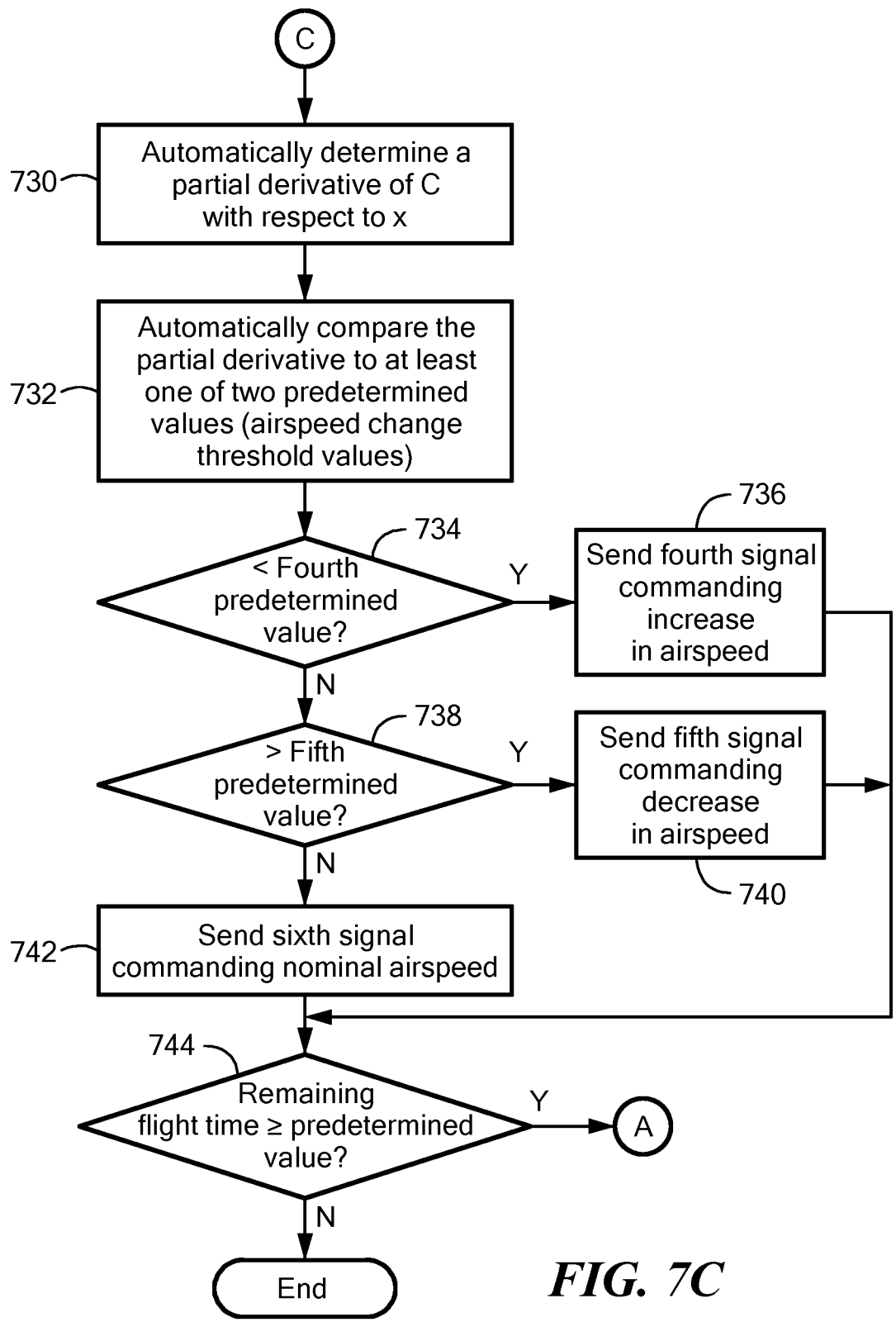

FIGS. 7A, 7B and 7C (collectively FIG. 7) contain a flowchart 700 schematically illustrating operations performed by embodiments of the present invention. The flowchart 700 includes a loop that includes operations 702-744.

At 702, signals are received, such as from a GPS receiver, inertial navigation system or the like. The signals indicate current location, current altitude and current heading of the aircraft. At 704, current coordinates of the aircraft, relative to location of the target, are automatically calculated from the signals indicating the current location of the aircraft. At 706, a current remaining amount of time of flight of the aircraft is automatically estimated from the signals indicating the current altitude of the aircraft.

Optionally, displacement of the aircraft as a result of wind may be calculated. The velocity of the wind may be estimated, such as a function of altitude. A table of wind velocity estimates may be used, as discussed herein. At 708, the aircraft's displacement due to the wind is estimated, and at 710, the current coordinates of the aircraft are adjusted by the estimated displacement of the aircraft. This operation results in automatically determining adjusted current coordinates of the aircraft. The aircraft displacement due to the wind may be calculated using equations (4) and (5).

Optionally, the coordinates of the aircraft may be rotated. At 712, the adjusted current coordinates of the aircraft may be automatically rotated, such that an axis of the rotated adjusted current coordinates of the aircraft points in a direction of horizontal current flight of the aircraft. This operation thereby automatically determines rotated adjusted current coordinates of the aircraft. Equations (6) and (7) may be used for these calculations.

At 714, at least one component of a current gradient of the function C is automatically determined. As noted, C satisfies a partial differential equation and a boundary condition. C represents miss distance as a function of at least the current heading of the aircraft, the current coordinates of the aircraft, relative to the location of the target, and the current remaining amount of time of flight of the aircraft. In some embodiments, C satisfies a Hamilton-Jacobi PDE of the form:

$$\frac{\partial C}{\partial t} = v\frac{\partial C}{\partial x} - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}} \quad (14)$$

PDE (1) is of the same form as PDE (14), although PDE (14) does not include the term $$-\delta v_{max}\left|\frac{\partial C}{\partial x}\right|$$

in PDE (1). As used herein, "of the form" means additional terms may be added, different coordinate systems (such as polar) may be used, different reference frames (such as target, relative to aircraft) may be used and signs of terms may be changed (negated) to accommodate different parameterizations of variables (such as using time since flight began, which counts up, rather than remaining flight time, which counts down).

Determining the at least one component of the current gradient may include calculating a projection of the current gradient along a direction that is orthogonal to a direction from the aircraft to the target. Determining the at least one component of the current gradient may include evaluating equation (8).

Figure 8:
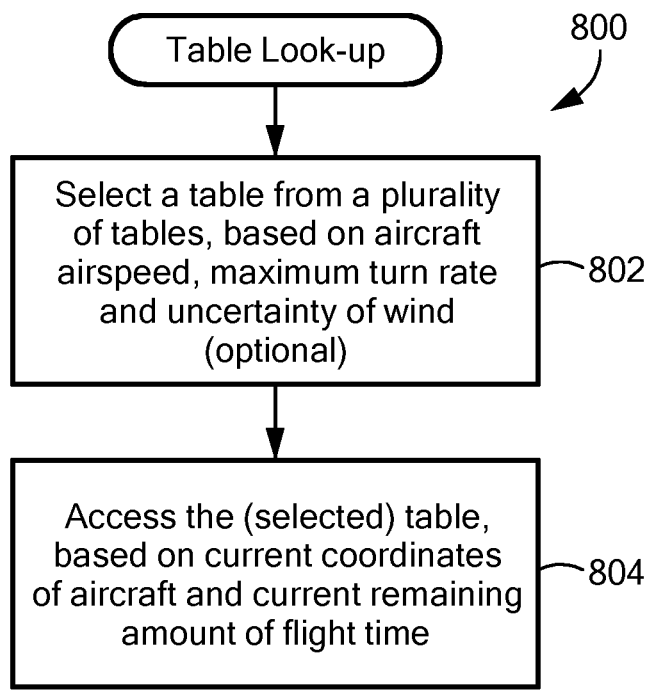
FIG. 8 is a flowchart schematically illustrating a table look-up operation optionally performed in the flowchart of FIG. 7, according to an embodiment of the present invention.

As indicated at 716, part or all of determining the component of the current gradient of the function C may involve a table look-up and/or a real-time calculation. FIG. 8 contains a flowchart 800 schematically illustrating an optional table look-up operation, according to an embodiment of the present invention. At 802, optionally, a table is selected from a plurality of tables, based on aircraft speed, maximum aircraft turn rate, uncertainty in wind speed and/or other conditions of the flight. The tables store pre-calculated values. At 804, the selected table is accessed, based on current coordinates of the aircraft and current remaining amount of flight time, to fetch one or more values from the selected table.

Figure 9:
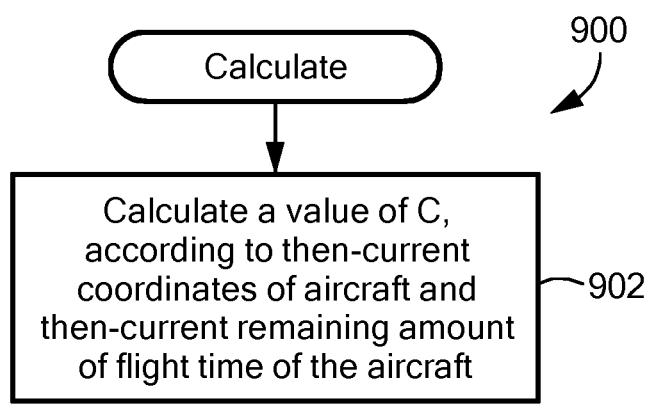
FIG. 9 is a flowchart schematically illustrating a real-time calculation of the function C and its partial derivatives optionally performed in the flowchart of FIG. 7, according to an embodiment of the present invention.

FIG. 9 contains a flowchart 900 schematically illustrating an optional real-time calculation, according to an embodiment of the present invention. Instead of, or in addition to, storing pre-calculated values in one or more tables, as discussed with reference to FIG. 8, for each iteration of the loop in FIG. 7, values of C and/or values of partial derivatives of C may be calculated according to then-current coordinates and then-current remaining amount of time of flight of the aircraft, as indicated at 902.

Returning to FIG. 7, at 718, the at least one component of the current gradient is automatically compared to at least one of a first predetermined value and a second predetermined value. At 720, if the calculated component of the current gradient is found by the comparing to be less than the first predetermined value, control passes to 722 where a first signal commanding a right turn of the aircraft is automatically sent, otherwise control passes to 724. At 724, if the calculated component of the current gradient is found by the comparing to be greater than the second predetermined value, a second signal commanding a left turn of the aircraft is automatically sent, otherwise control passes to 728. At 728, optionally, a third signal commanding straight flight of the aircraft is automatically sent. Thus, the first and second predetermined values establish a deadband.

Although both a first and a second predetermined value are described, the first and second predetermined values may be equal to each other or they can be different from each other. Although both the first and second predetermined values are described as being on opposite sides of zero, other pairs of predetermined values that are both on the same side of zero may be used, such as in cases where the component of the current gradient of C that represents straight flight is other than zero. In some embodiments, the result of equation (8) is rounded or truncated to effectively create the deadband, and the sign of equation (8) can be tested to determine whether to generate a left or right turn command. If equation (8) evaluates to zero, no turn command, or a straight flight command, may be generated. Such rounding or truncating is equivalent to comparing to two different predetermined values, i.e., values at which unrounded or untruncated results of equation (8) would yield equivalent results (left and right turn commands).

Sending the first signal commanding a right turn may include sending a signal commanding a maximum right turn of the aircraft. Similarly, sending the second signal commanding a left turn may include sending a signal commanding a maximum left turn of the aircraft. Regardless of which signal, if any, is sent, control then passes to 730.

If the aircraft airspeed can be adjusted, the aircraft is characterized by an amount ($\delta v_{max}$) by which its airspeed can be changed while maintaining flight. C optionally takes into account the amount by which the aircraft airspeed can be changed. For example, the term $$-\delta v_{max}\left|\frac{\partial C}{\partial x}\right|$$

in equation (1) takes into account the amount by which the aircraft airspeed can be changed.

At 730, optionally, a partial derivative of C with respect to x, see equation (11), is automatically determined. At 732, the partial derivative is automatically compared to at least to one of a fourth predetermined value and a fifth predetermined value. At 734, if the partial derivative is found by the comparing to be less than the fourth predetermined value, control passes to 736 where a fourth signal commanding an increase in airspeed of the aircraft is automatically sent, otherwise control passes to 738. At 738, if the partial derivative is found by the comparing to be greater than the fifth predetermined value, control passes to 740 where a fifth signal commanding a decrease in airspeed of the aircraft is automatically sent, otherwise control passes to 742. At 742, optionally, a sixth signal commanding nominal airspeed of the aircraft is automatically sent. Regardless of which signal, if any, is sent, control then passes to 744.

At 744, if the current remaining amount of time of flight of the aircraft is not less than a third predetermined value, control returns to 702 for another iteration of the loop. However, if the remaining flight time is less than the third predetermined value, the process ends.

Guidance, Navigation and Control System and Method Options

Although the function C is described as accepting parameters x, y and t, the function C can accept equivalent information, such as x, y and altitude. In this case, the function C internally calculates remaining flight time from altitude, or the function C uses altitude directly. For powered aircraft, a constant descent rate may be assumed, or the PDE may be modified to take into account a variable descent rate.

Although the function C is described as accepting parameter t as an amount of remaining flight time in the form of a variable that counts down, by changing the signs of, i.e., negating, the terms $$v\frac{\partial C}{\partial x}, -\delta v_{max}\left|\frac{\partial C}{\partial x}\right|, -u_{max}\left|\frac{\partial C}{\partial x}y - \frac{\partial C}{\partial y}x\right| \text{ and}$$

$$w_{max}\left(\left(\frac{\partial C}{\partial x}\right)^2 + \left(\frac{\partial C}{\partial y}\right)^2\right)^{\frac{1}{2}},$$

the PDE (1) accepts t as an amount of remaining flight time in the form of a variable that counts up. Changing these signs in order to accept t as an amount of remaining flight time in the form of a variable that counts up is considered, in the description and in the claims, to be equivalent and within the scope of a partial differential equation "of the form" given.

DEFINITIONS

As used herein, the following terms have the following definitions.

Heading—direction of velocity vector of aircraft, with respect to surrounding air.

Course—direction of velocity vector of aircraft, with respect to ground.

Airspeed—speed of aircraft, with respect to surrounding air.

Wind speed—speed of wind, with respect to ground.

While specific parameter values may be recited for disclosed embodiments, within the scope of the invention, the values of all of parameters may vary over wide ranges to suit different applications. While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible, non-transitory, non-writable storage media (e.g., read-only memory devices within a computer, such as ROM, or devices readable by a computer I/O attachment, such as CD-ROM or DVD disks), information alterably stored on tangible, non-transitory, writable storage media (e.g., floppy disks, removable flash memory and hard drives) or information conveyed to a computer through a communication medium, including wired or wireless computer networks. Moreover, while embodiments may be described in connection with various illustrative data structures, such as tables, systems may be embodied using a variety of data structures.

What is claimed is:

1. A method for automatically guiding an aircraft toward a target, the aircraft having a maximum turn rate, the method comprising:
   (a) receiving signals indicating current location, current altitude and current heading of the aircraft;
   (b) from the signals indicating the current location of the aircraft, automatically calculating current coordinates of the aircraft, relative to location of the target;
   (c) from the signals indicating the current altitude of the aircraft, automatically estimating current remaining amount of time of flight of the aircraft;
   (d) automatically determining at least one component of a current gradient of function C, wherein C satisfies a partial differential equation and a boundary condition, and C represents miss distance as a function of at least the current heading of the aircraft, the current coordinates of the aircraft, relative to the location of the target, and the current remaining amount of time of flight of the aircraft;
   (e) automatically comparing the at least one component of the current gradient to at least one of a first predetermined value and a second predetermined value;
   (f) if the at least one component of the current gradient is found by the comparing to be less than the first predetermined value, automatically sending a first signal commanding a turn of the aircraft in a first direction;
   (g) if the at least one component of the current gradient is found by the comparing to be greater than the second predetermined value, automatically sending a second signal commanding a turn of the aircraft in a second direction opposite the first direction; and
   (h) repeating (a)-(g) until the current remaining amount of time of flight of the aircraft is less than a third predetermined value.

2. A method according to claim 1, wherein:
   the aircraft is characterized by an amount by which its airspeed can be changed while maintaining flight; and
   C takes into account the amount by which the aircraft airspeed can be changed.

3. A method according to claim 1, wherein C satisfies a Hamilton-Jacobi partial differential equation.

4. A method according to claim 3, wherein:
   the method automatically guides the aircraft through wind;

C satisfies a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}},$$

and
the boundary condition is of the form:
$C(x,y,t)=(x^2+y^2)^{1/2}$ at $t=0$, where:

x and y represent coordinates of the aircraft relative to the target, in a frame whose x axis is aligned with the heading of the aircraft,
t represents remaining amount of time of flight of the aircraft,
v represents nominal aircraft airspeed,
$u_{max}$ represents the maximum turn rate of the aircraft, and
$w_{max}$ represents maximum anticipated speed of the wind.

5. A method according to claim 4, wherein determining the at least one component of the current gradient comprises calculating a projection of the current gradient along a direction that is orthogonal to a direction from the aircraft to the target.

6. A method according to claim 5, wherein determining the at least one component of the current gradient of C comprises calculating a difference between $$\frac{\partial C}{\partial x}y \text{ and } \frac{\partial C}{\partial y}x.$$

7. A method according to claim 4, wherein:
the aircraft is characterized by an amount ($\delta v_{max}$) by which nominal airspeed of the aircraft can be changed while maintaining flight; and
C satisfies a partial differential equation of the form:

$$\frac{\partial C}{\partial t} = v\frac{\partial C}{\partial x} - \delta v_{max}\left|\frac{\partial C}{\partial x}\right| - u_{max}\left|\frac{\partial C}{\partial x}y - \frac{\partial C}{\partial y}x\right| + w_{max}\left(\left(\frac{\partial C}{\partial x}\right)^2 + \left(\frac{\partial C}{\partial y}\right)^2\right)^{\frac{1}{2}}.$$

8. A method according to claim 7, further comprising:
automatically comparing $$\frac{\partial C}{\partial x}$$

to at least one of a fourth predetermined value and a fifth predetermined value;
if $$\frac{\partial C}{\partial x}$$

is found by the comparing to be less than the fourth predetermined value, automatically sending a fourth signal commanding an increase in airspeed of the aircraft; and
if $$\frac{\partial C}{\partial x}$$

is found by the comparing to be greater than the fifth predetermined value, automatically sending a fifth signal commanding a decrease in airspeed of the aircraft.

9. A method according to claim 8, wherein automatically determining the at least one component of the current gradient of C comprises:
selecting a table from a plurality of tables, wherein the plurality of tables stores pre-calculated values of partial derivatives of C for a plurality of nominal aircraft airspeeds, a plurality of maximum turn rates and a plurality of uncertainties of speed of the wind, wherein the selecting is based on the nominal aircraft airspeed, the maximum turn rate of the aircraft and uncertainty of speed of the wind; and
accessing the selected table according to the current coordinates and the current remaining amount of time of flight of the aircraft, wherein the table stores pre-calculated values of the partial derivatives of C for a plurality of current coordinates and a plurality of remaining amounts of time of flight of the aircraft.

10. A method according to claim 1, wherein automatically determining the at least one component of the current gradient of C comprises accessing a table according to the current coordinates and the current remaining amount of time of flight of the aircraft, wherein the table stores pre-calculated values of partial derivatives of C for a plurality of current coordinates and a plurality of remaining amounts of time of flight of the aircraft.

11. A method according to claim 10, wherein:
the method automatically guides the aircraft through wind; and
accessing the table comprises selecting a table of a plurality of tables, wherein the plurality of tables stores pre-calculated values of partial derivatives of C for a plurality of aircraft airspeeds, a plurality of maximum turn rates and a plurality of uncertainties of speed of the wind, wherein the selecting is based on the aircraft airspeed, the maximum turn rate of the aircraft and uncertainty of speed of the wind.

12. A method according to claim 1, wherein automatically determining the at least one component of the current gradient of C comprises accessing a table according to the current coordinates and the current remaining amount of time of flight of the aircraft, wherein the table stores pre-calculated partial derivatives of C for a plurality of current coordinates and a plurality of remaining amounts of time of flight of the aircraft.

13. A method according to claim 1, wherein automatically determining the at least one component of the current gradient of C comprises, after each time receiving the signals indicating a then-current location of the aircraft, calculating a partial derivative of C according to then-current coordinates and then-current remaining amount of time of flight of the aircraft.

14. A method according to claim 1, further comprising:
estimating displacement of the aircraft due to wind; and
adjusting the current coordinates of the aircraft by the estimated displacement of the aircraft, thereby automatically determining adjusted current coordinates of the aircraft.

15. A method according to claim 14, wherein estimating the displacement of the aircraft due to the wind comprises:
estimating velocity of the wind as a function of altitude; and calculating:

$$\Delta r_N = \frac{1}{v_D} \int_{h_{ip}}^{h_{ac}} w_N(h)\,dh, \text{ and}$$

$$\Delta r_E = \frac{1}{v_D} \int_{h_{ip}}^{h_{ac}} w_E(h)\,dh,$$

where:
$\Delta r_N$ represents north position displacement of the aircraft, relative to the location of the target;
$\Delta r_E$ represents east position displacement of the aircraft, relative to the location of the target;
$v_D$ represents descent rate of the aircraft;
$h_{ip}$ represents altitude of the target;
$h_{ac}$ represents altitude of the aircraft;
$w_N(h)$ represents north component of the velocity of the wind as a function of altitude (h); and
$w_E(h)$ represents east component of the velocity of the wind as a function of altitude (h).

16. A method according to claim 15, wherein estimating the velocity of the wind comprises accessing a table according to the altitude of the aircraft, wherein the table stores a plurality of velocities of the wind for a corresponding plurality of altitudes.

17. A method according to claim 14, further comprising rotating the adjusted current coordinates of the aircraft, thereby automatically determining rotated adjusted current coordinates of the aircraft, such that an axis of the rotated adjusted current coordinates of the aircraft points in a direction of horizontal current flight of the aircraft.

18. A method according to claim 17, wherein:
C satisfies a partial differential equation of the form:

$$\frac{\partial C}{\partial t} = v\frac{\partial C}{\partial x} - u_{max}\left|\frac{\partial C}{\partial x}y - \frac{\partial C}{\partial y}x\right| + \delta w_{max}\left(\left(\frac{\partial C}{\partial x}\right)^2 + \left(\frac{\partial C}{\partial y}\right)^2\right)^{\frac{1}{2}},$$

and
the boundary condition is of the form:

$C(x,y,t)=(x^2+y^2)^{1/2}$ at $t=0$, where:

x and y represent rotated adjusted current coordinates of the aircraft relative to the target, in a frame whose x axis is aligned with the heading of the aircraft;
t represents remaining amount of time of flight of the aircraft;
v represents nominal aircraft airspeed;
$u_{max}$ represents the maximum turn rate of the aircraft; and
$\delta w_{max}$ represents maximum uncertainty of speed of the wind.

19. A method according to claim 17, wherein adjusting the current coordinates of the aircraft by the estimated displacement due to the wind and rotating the adjusted current coordinates of the aircraft comprise calculating:

$x=+(r_N+\Delta r_N)\cos \psi+(r_E+\Delta r_E)\sin \psi$, and $y=-(r_N+\Delta r_N)\sin \psi+(r_E+\Delta r_E)\cos \psi$, where:

$\psi$ represents the current heading of the aircraft.

20. A system for automatically guiding an aircraft toward a target, the aircraft having a maximum turn rate, the system comprising:
a coordinates calculator receiving signals indicating current location of the aircraft and automatically generating signals indicating current coordinates of the aircraft, relative to location of the target;
a flight time estimator receiving signals indicating current altitude of the aircraft and automatically generating signals indicating estimated current remaining amount of time of flight of the aircraft;
a gradient component calculator coupled to the coordinates calculator and to the flight time estimator and automatically generating signals indicating at least one component of a current gradient of function C, where C satisfies a partial differential equation and a boundary condition, and C represents miss distance as a function of at least current heading of the aircraft, the current coordinates of the aircraft, relative to the target, and the current remaining amount of time of flight of the aircraft;
a first comparator coupled to the gradient component calculator and comparing the at least one component of the current gradient of C to at least one of a first predetermined value and a second predetermined value;
a first signal generator coupled to the first comparator and generating a first signal commanding a turn of the aircraft in a first direction if the at least one component of the current gradient is found by the first comparator to be less than the first predetermined value; and
a second signal generator coupled to the first comparator and generating a second signal commanding a turn of the aircraft in a second direction different than the first direction if the at least one component of the current gradient is found by the first comparator to be greater than the second predetermined value; wherein
the coordinates calculator, the flight time estimator, the gradient component calculator, the first comparator, the first signal generator and the second signal generator operate repeatedly until the current remaining amount of time of flight of the aircraft is less than a third predetermined value.

21. A non-transitory computer-readable medium encoded with instructions that, when executed by a processor, establish processes for performing a computer-implemented method of providing automatic guidance of an aircraft toward a target, the aircraft having a maximum turn rate, the processes comprising:
(a) receiving signals indicating current location, current altitude and current heading of the aircraft;
(b) from the signals indicating the current location of the aircraft, automatically calculating current coordinates of the aircraft, relative to location of the target;
(c) from the signals indicating the current altitude of the aircraft, automatically estimating current remaining amount of time of flight of the aircraft;
(d) automatically determining at least one component of a current gradient of function C, wherein C satisfies a partial differential equation and a boundary condition, and C represents miss distance as a function of at least the current heading of the aircraft, the current coordinates of the aircraft, relative to the location of the target, and the current remaining amount of time of flight of the aircraft;
(e) automatically comparing the at least one component of the current gradient to at least one of a first predetermined value and a second predetermined value;
(f) if the at least one component of the current gradient is found by the comparing to be less than the first predetermined value, automatically sending a first signal commanding a turn of the aircraft in a first direction;

(g) if the at least one component of the current gradient is found by the comparing to be greater than the second predetermined value, automatically sending a second signal commanding a turn of the aircraft in a second direction opposite the first direction; and
(h) repeating (a)-(g) until the current remaining amount of time of flight of the aircraft is less than a third predetermined value.

* * * * *